US012548900B2

(12) United States Patent
Yang et al.

(10) Patent No.: US 12,548,900 B2
(45) Date of Patent: Feb. 10, 2026

(54) ULTRA-WIDEBAND ANTENNA AND DEVICE

(71) Applicant: ZTE CORPORATION, Guangdong (CN)

(72) Inventors: Songmao Yang, Guangdong (CN); Dianping Xu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 234 days.

(21) Appl. No.: 18/009,997

(22) PCT Filed: Jun. 10, 2021

(86) PCT No.: PCT/CN2021/099426
§ 371 (c)(1),
(2) Date: Dec. 13, 2022

(87) PCT Pub. No.: WO2021/254250
PCT Pub. Date: Dec. 23, 2021

(65) Prior Publication Data
US 2023/0335900 A1 Oct. 19, 2023

(30) Foreign Application Priority Data
Jun. 15, 2020 (CN) ........................ 202010542874.5

(51) Int. Cl.
*H01Q 5/25* (2015.01)
*H01Q 1/38* (2006.01)
(Continued)

(52) U.S. Cl.
CPC ................ *H01Q 5/25* (2015.01); *H01Q 1/38* (2013.01); *H01Q 1/50* (2013.01); *H01Q 9/40* (2013.01)

(58) Field of Classification Search
USPC .......................................................... 343/853
See application file for complete search history.

(56) References Cited

U.S. PATENT DOCUMENTS

2006/0119529 A1 6/2006 Krupezevic et al.
2007/0290926 A1 12/2007 Tseng

FOREIGN PATENT DOCUMENTS

CN 102255141 A 11/2011
CN 102280702 A * 12/2011
(Continued)

OTHER PUBLICATIONS

Translation of CN-102280702-A (Year: 2011).*
(Continued)

*Primary Examiner* — Crystal L Hammond
*Assistant Examiner* — Brandon Sean Woods
(74) *Attorney, Agent, or Firm* — Dority & Manning, P.A.

(57) ABSTRACT

An ultra-wideband antenna and a device are provided. A main radiation unit (2) and a microstrip line feed unit (3) of the ultra-wideband antenna are provided on the front surface of a dielectric substrate (1), and the microstrip line feed unit (3) is electrically connected to the main radiation unit (2). A grounding plate (4) is provided on the back surface of the dielectric substrate (1) opposite to the front surface, and at least a part of a feed unit (15) is extended from a preset location to a terminal end (6) of the microstrip line feed unit (3) or a tail part (16) of the grounding plate (4).

14 Claims, 23 Drawing Sheets

(51) Int. Cl.
*H01Q 1/50* (2006.01)
*H01Q 9/40* (2006.01)

(56) References Cited

FOREIGN PATENT DOCUMENTS

| | | | | | |
|---|---|---|---|---|---|
| CN | 103151610 A | | 6/2013 | | |
| CN | 104701614 A | * | 6/2015 | | |
| CN | 105305055 A | | 2/2016 | | |
| CN | 205646144 U | | 10/2016 | | |
| KR | 100960999 B1 | | 6/2010 | | |
| KR | 101846121 B1 | * | 4/2018 | ............... | H01Q 5/25 |

OTHER PUBLICATIONS

Translation of CN-104701614-A (Year: 2015).*
Extended European Search Report for corresponding Application No. 21826544, dated May 29, 2024, 12 days.
Yang et al., "Miniature Omni-directional Ultra-wideband Antenna", Institute of applied electromagnetics, Sichuan University, China, 2010, p. 969-971.
International search report of PCT Patent Application No. PCT/CN2021/099426 issued on Aug. 30, 2021.
Chinese Office Action (w/ English translation) for corresponding Application No. 202010542874.5, dated Aug. 12, 2024, 15 pages.

* cited by examiner

ULTRA-WIDEBAND ANTENNA AND DEVICE

CROSS-REFERENCE TO RELATED APPLICATION

The present application is based on and claims the benefit of priority to Chinese patent application No. 202010542874.5, filed on Jun. 15, 2020, which is incorporated herein by reference in its entirety.

TECHNICAL FIELD

Embodiments of the present disclosure relate to the field of wireless communications, and in particular to an ultra-wideband antenna and a device.

BACKGROUND

In recent years, ultra-wideband technology is gradually applied, which raises a higher requirement for antenna technology. The traditional loop antenna has poor standing wave at some frequency ranges, and thus it is hard to widen the working frequency band thereof.

SUMMARY

Embodiments of the present disclosure aim to provide an ultra-wideband antenna and a device.

In view of the above, the embodiments of the disclosure provide an ultra-wideband antenna and a device. The ultra-wideband antenna includes: a dielectric substrate, a main radiation unit and a feed unit. The feed unit includes a microstrip line feed unit and a grounding plate. The dielectric substrate includes a front surface and a back surface opposite to each other. The main radiation unit and the microstrip line feed unit are arranged on the front surface, and the microstrip line feed unit is electrically connected to the main radiation unit. The grounding plate is arranged on the back surface. At least a part of the feed unit is configured to expand from a preset location to a terminal end of the microstrip line feed unit or a tail part of the grounding plate.

The embodiments of the disclosure also provide a device including the ultra-wideband antenna.

Figure 1:
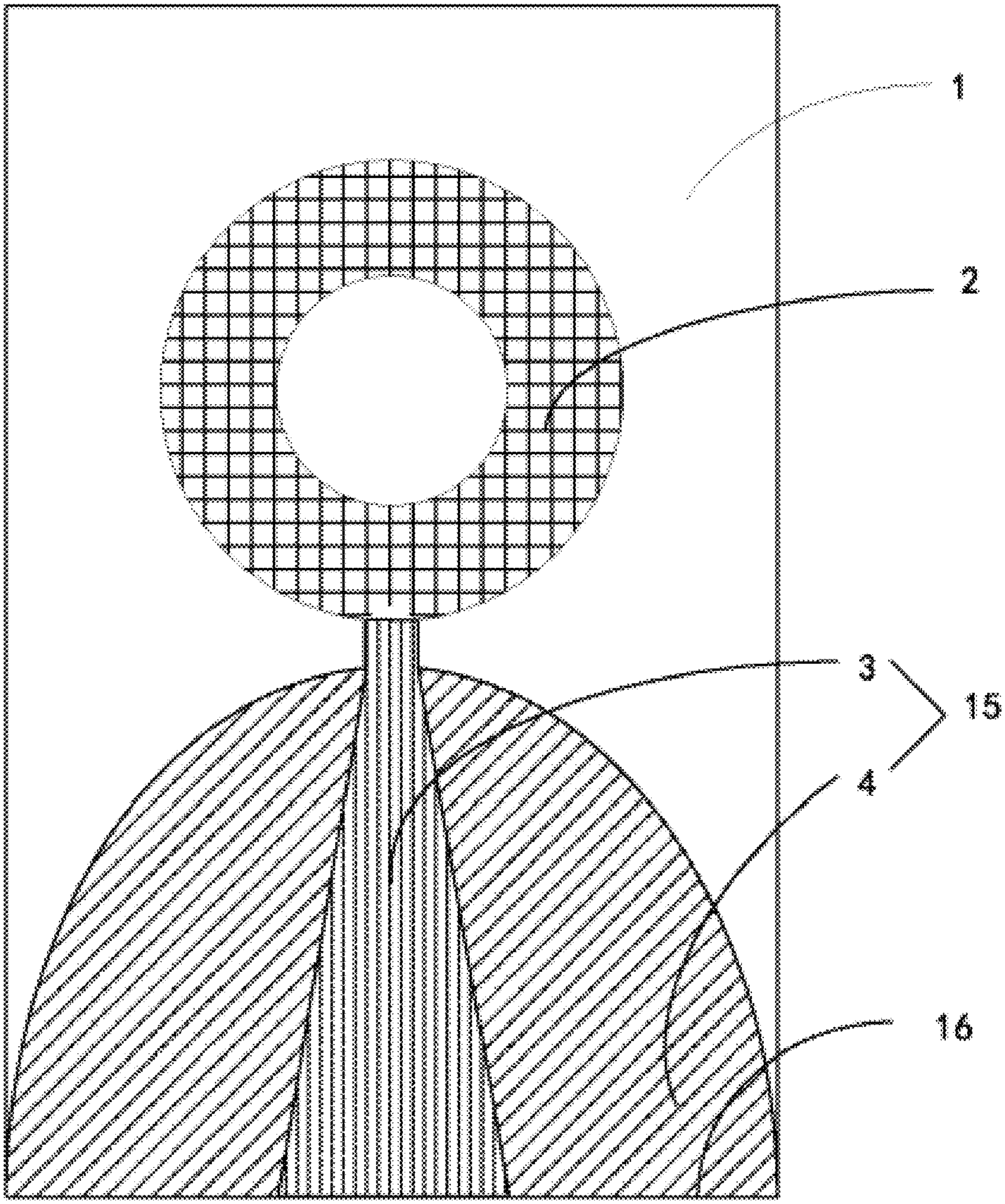
FIG. 1 is a structural perspective view I of an ultra-wideband antenna provided in an embodiment of the disclosure.
Figure 2:
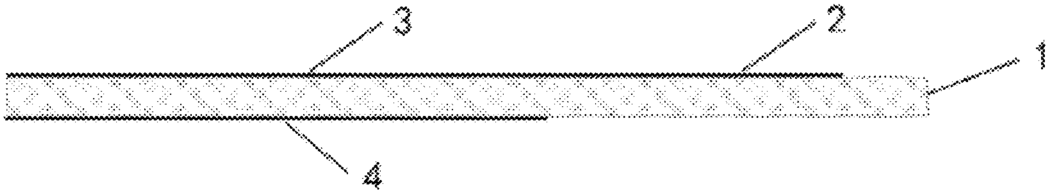
FIG. 2 is a side view of an ultra-wideband antenna provided in an embodiment of the disclosure.

REFERENCE NUMERALS dielectric substrate 1, main radiation unit 2, microstrip line feed unit 3, grounding plate 4, initial end 5, terminal end 6, bottom 7, first location 8, axis 9 of grounding plate, first feed-in part 10, second feed-in part 11, interface location 12 between first connection end and second connection end, preset region 13, symmetry axis 14 of projection of microstrip line feed unit on front surface, feed unit 15, tail part 16, first curve 17, and second curve 18.

DETAILED DESCRIPTION

In order to make the objectives, technical solutions and advantages of the disclosure clearer, various embodiments of the disclosure are further illustrated in details below in conjunction with the accompanying drawings. However, those of ordinary skills in the art would appreciate that many technical details are provided in the various embodiments of the disclosure in order to enable a reader to better understand the disclosure. However, the technical solution claimed by the disclosure can also be realized even without these technical details and various changes and modifications based on the following embodiments.

It should be understood that the specific embodiments described herein are merely used to explain the disclosure and are not intended to limit the disclosure.

In the subsequent description, postfixes such as "module", "part" or "unit" for representing elements are used merely for facilitating the description of the disclosure, and themselves do not have specified meanings. Therefore, "module", "part" or "unit" may be used in a mixed manner.

An embodiment of the disclosure provides an ultra-wideband antenna, including a dielectric substrate, a main radiation unit and a feed unit. The feed unit includes a microstrip line feed unit and a grounding plate. The dielectric substrate includes a front surface and a back surface opposite to each other. The main radiation unit and the microstrip line feed unit are arranged on the front surface, and the microstrip line feed unit is electrically connected to the main radiation unit. The grounding plate is arranged on the back surface. At least a part of the feed unit is configured to expand from a preset location to a terminal end of the microstrip line feed unit or a tail part of the grounding plate.

Referring to FIG. 1 to FIG. 4, the embodiment provides an ultra-wideband antenna. The ultra-wideband antenna includes: a dielectric substrate 1, a main radiation unit 2 and a feed unit 15. The feed unit includes a microstrip line feed unit 3 and a grounding plate 4. The dielectric substrate 1 includes a front surface and a back surface opposite to each other. The main radiation unit 2 and the microstrip line feed unit 3 are arranged on the front surface, and electrically connected to each other. The grounding plate 4 is arranged on the back surface. At least a part of the feed unit 15 is configured to expand from a preset location to the terminal end 6 of the microstrip line feed unit 3 or the tail part 16 of the grounding plate 4.

In some embodiments, further referring to FIG. 1 to FIG. 4, the main radiation unit 2 and the microstrip line feed unit 3 are arranged on the front surface of the dielectric substrate 1, an initial end 5 of the micro strip line feed unit 3 is electrically connected to the main radiation unit 2, and a terminal end 6 of the microstrip line feed unit 3 extends to a bottom 7 of the dielectric substrate 1. The grounding plate 4 is arranged on the back surface, and is a reference ground of the microstrip line feed unit 3. The grounding plate 4 is located below a projection region of the main radiation unit 2 on the back surface, at least a part of a projection region of the microstrip line feed unit 3 on the back surface coincides with a region where the grounding plate 4 is located, and a projection region of the terminal end 6 on the back surface is within a region where the grounding plate 4 is located. At least a part of the feed unit 15 is configured to expand from a preset location to the bottom 7.

In some embodiments, the microstrip line feed unit includes a microstrip line, and the grounding plate is a reference ground of the microstrip line.

In some embodiments, the dielectric substrate is a printed circuit board, and the main radiation unit is configured to transmit/receive an electromagnetic wave signal.

Figure 3:
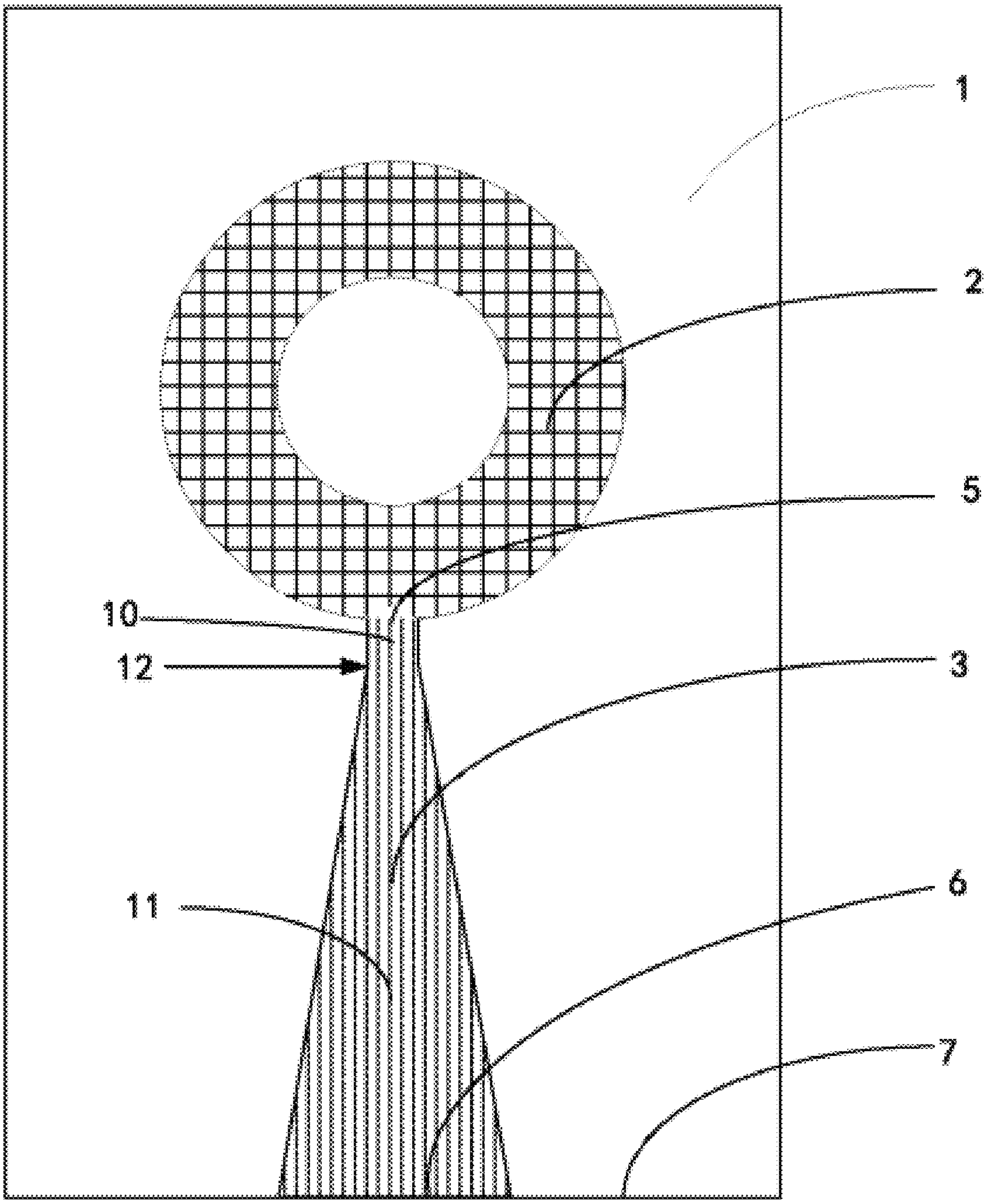
FIG. 3 is a structural schematic diagram illustrating a front surface of a dielectric substrate of an ultra-wideband antenna provided in an embodiment of the disclosure.
Figure 4:
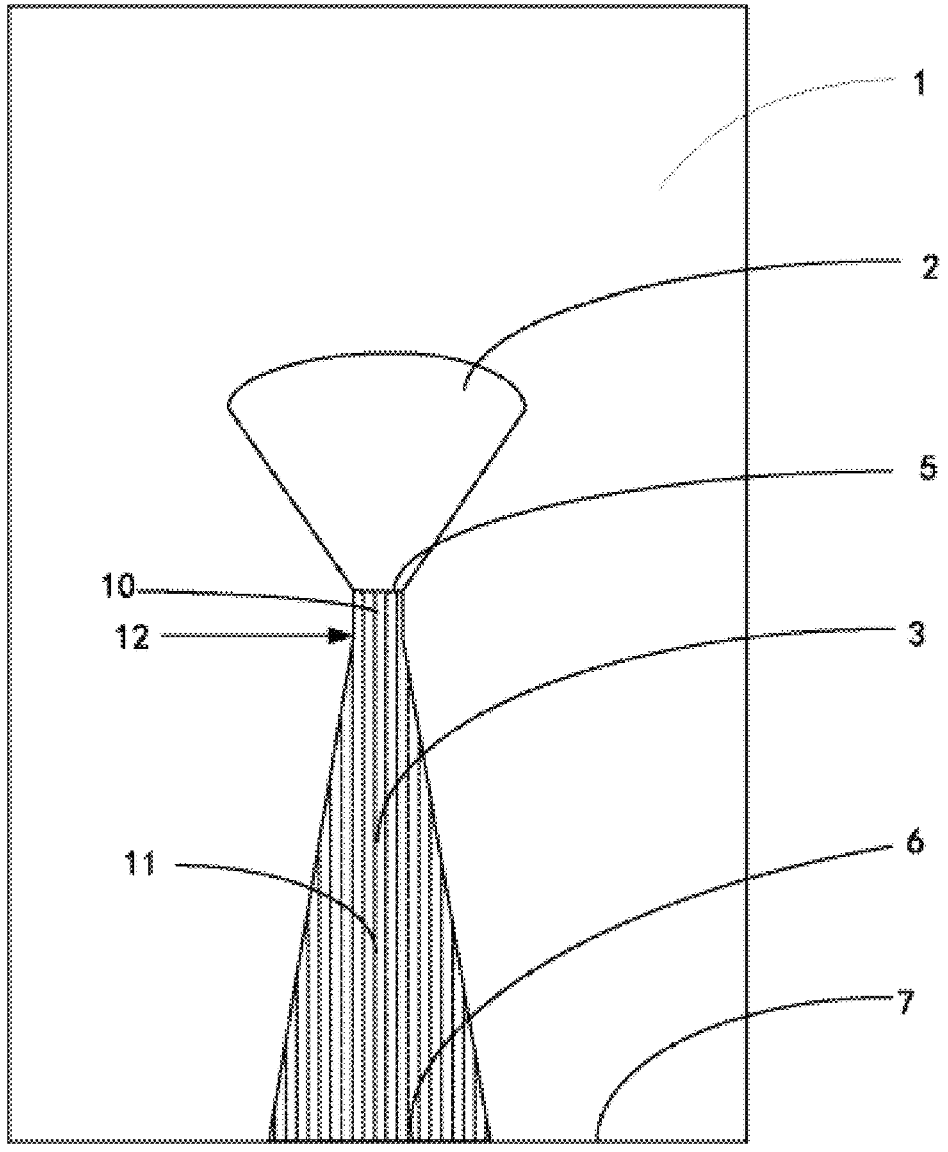
FIG. 4 is a structural schematic diagram illustrating a front surface of a dielectric substrate of another ultra-wideband antenna provided in an embodiment of the disclosure.

In some embodiments, the main radiation unit includes, but not limited to an annulus main radiation unit as shown in FIG. 3, a sectorial main radiation unit as shown in FIG. 4, etc.

In some embodiments, the preset location may be located on at least one of the microstrip line feed unit and the grounding plate, and the ultra-wideband antenna is constructed in at least one of the following manners: the microstrip line feed unit is configured to expand from the preset location to the bottom; and the grounding plate is configured to expand from the preset location to the bottom.

Figure 5:
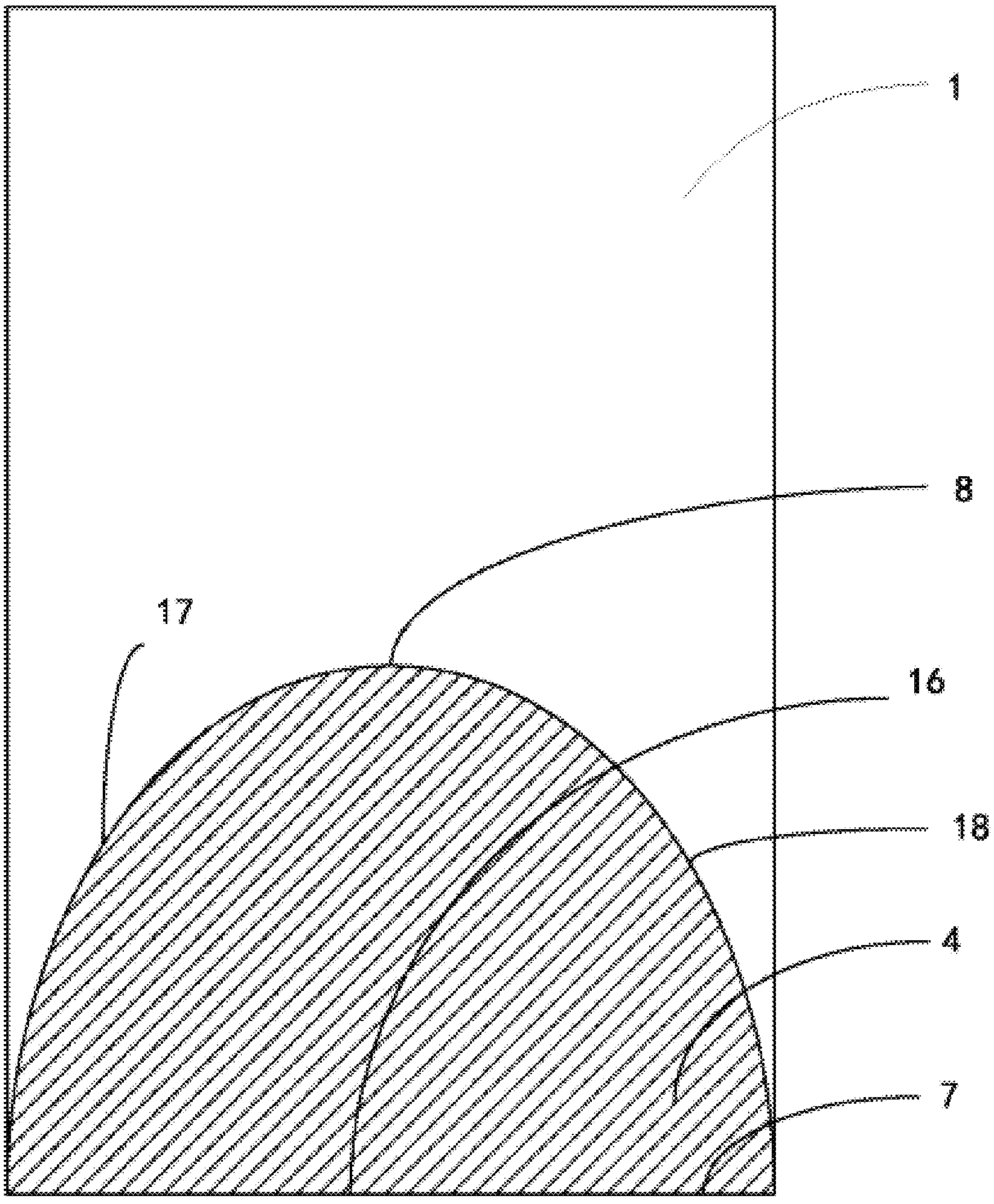
FIG. 5 is a structural schematic diagram I illustrating a back surface of a dielectric substrate of an ultra-wideband antenna provided in an embodiment of the disclosure.

In some embodiments, the preset location includes a first location located on the grounding plate. Further referring to FIG. 5, the grounding plate 4 is configured to expand from the first location 8 to the tail part 16 of the grounding plate.

In some embodiments, the first location is within the projection region, on the back surface, of a preset length of the microstrip line feed unit in a direction from the initial end to the terminal end, and the preset length includes one third of the length of the microstrip line feed unit.

Figure 10:
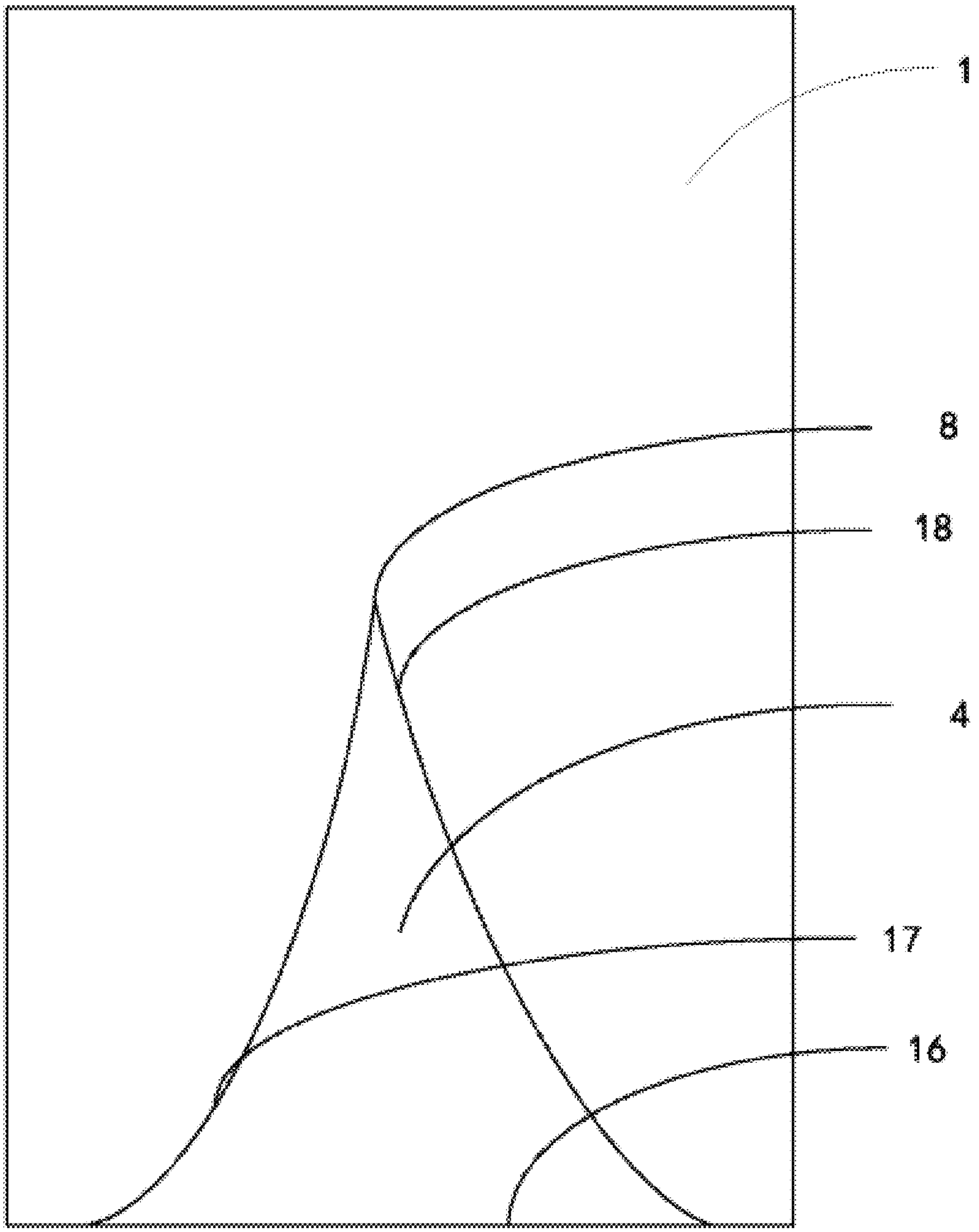
FIG. 10 is a structural schematic diagram VI illustrating a back surface of a dielectric substrate of an ultra-wideband antenna provided in an embodiment of the disclosure.

In some embodiments, referring to FIG. 10, the grounding plate is configured to gradually expand from the first location to the tail part 16 of the grounding plate according to an exponential function. In the projection of the grounding plate on the front surface, the projections of two contour lines (sides of the grounding plate other than a side coinciding with the bottom of the dielectric substrate) from the first location to two sides of the tail part 16 are a first curve and a second curve respectively, and the first curve 17 and the second curve 18 are exponential curves.

In some embodiments, referring to FIG. 5, FIG. 6, FIG. 9 and FIG. 10, in the projection of the grounding plate on the front surface, the projections of two contour lines (sides of the grounding plate other than the side coinciding with the bottom of the dielectric substrate) from the first location to two sides of the tail part 16 of the grounding plate are the first curve 17 and the second curve 18 respectively.

Figure 9:
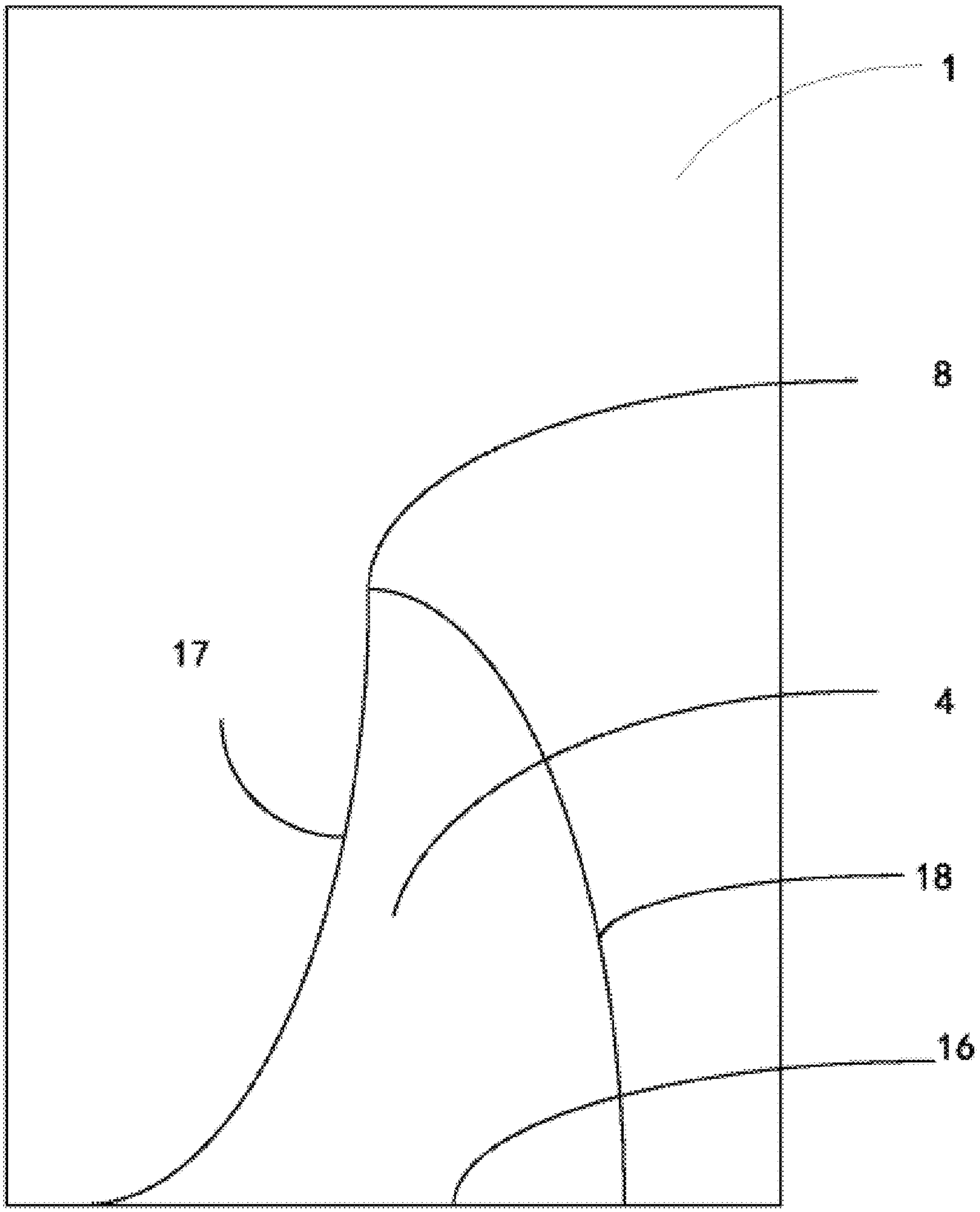
FIG. 9 is a structural schematic diagram V illustrating a back surface of a dielectric substrate of an ultra-wideband antenna provided in an embodiment of the disclosure.

In some embodiments, referring to FIG. 9, the first curve and the second curve are different in bending direction.

Figure 6:
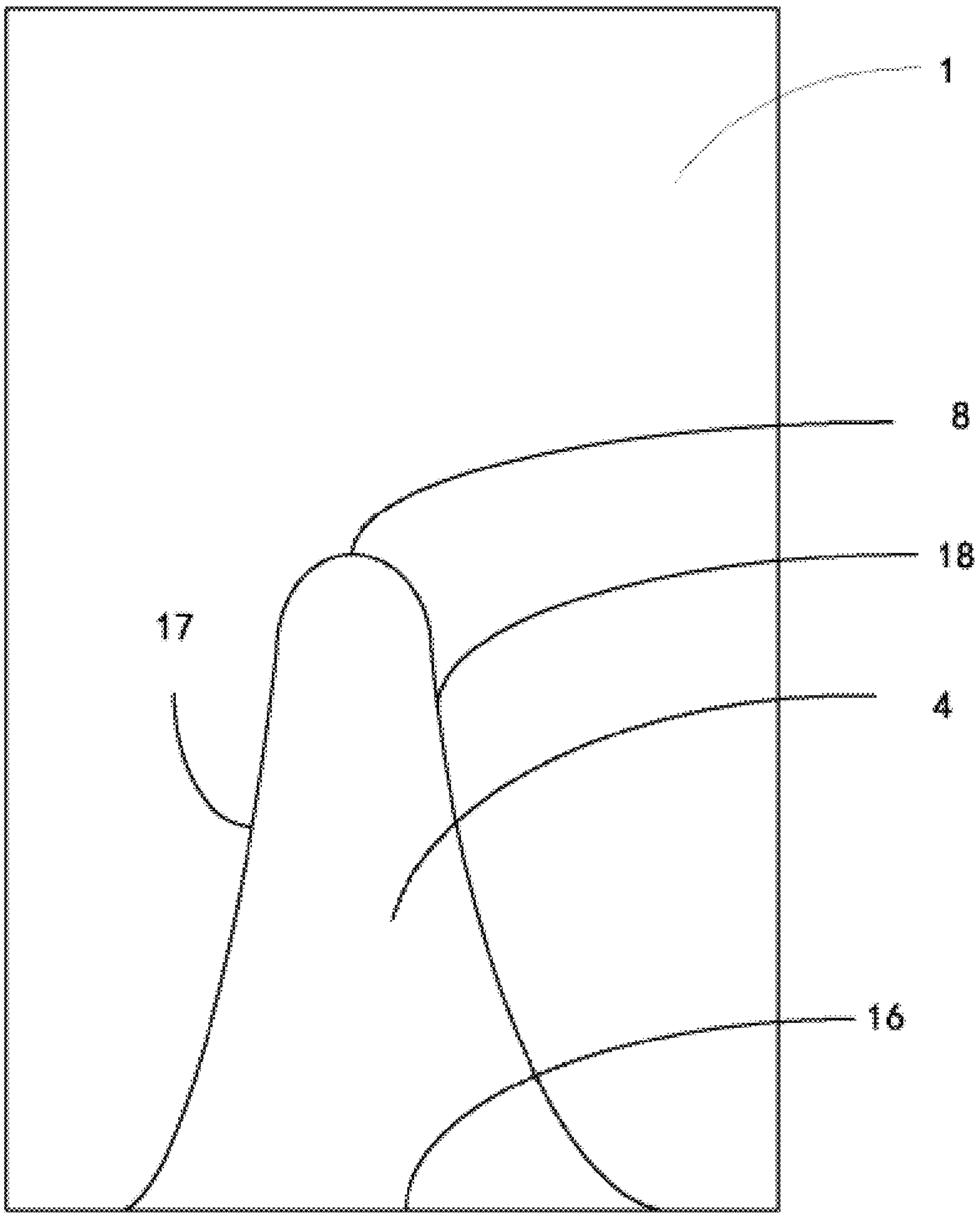
FIG. 6 is a structural schematic diagram II illustrating a back surface of a dielectric substrate of an ultra-wideband antenna provided in an embodiment of the disclosure.

In some embodiments, referring to FIG. 6 and FIG. 9, at least one of the two curves, that is, the projections of the contour lines from the first location to the two sides of the bottom in the projection of the grounding plate on the front surface, includes at least two different curvatures.

Figure 7:
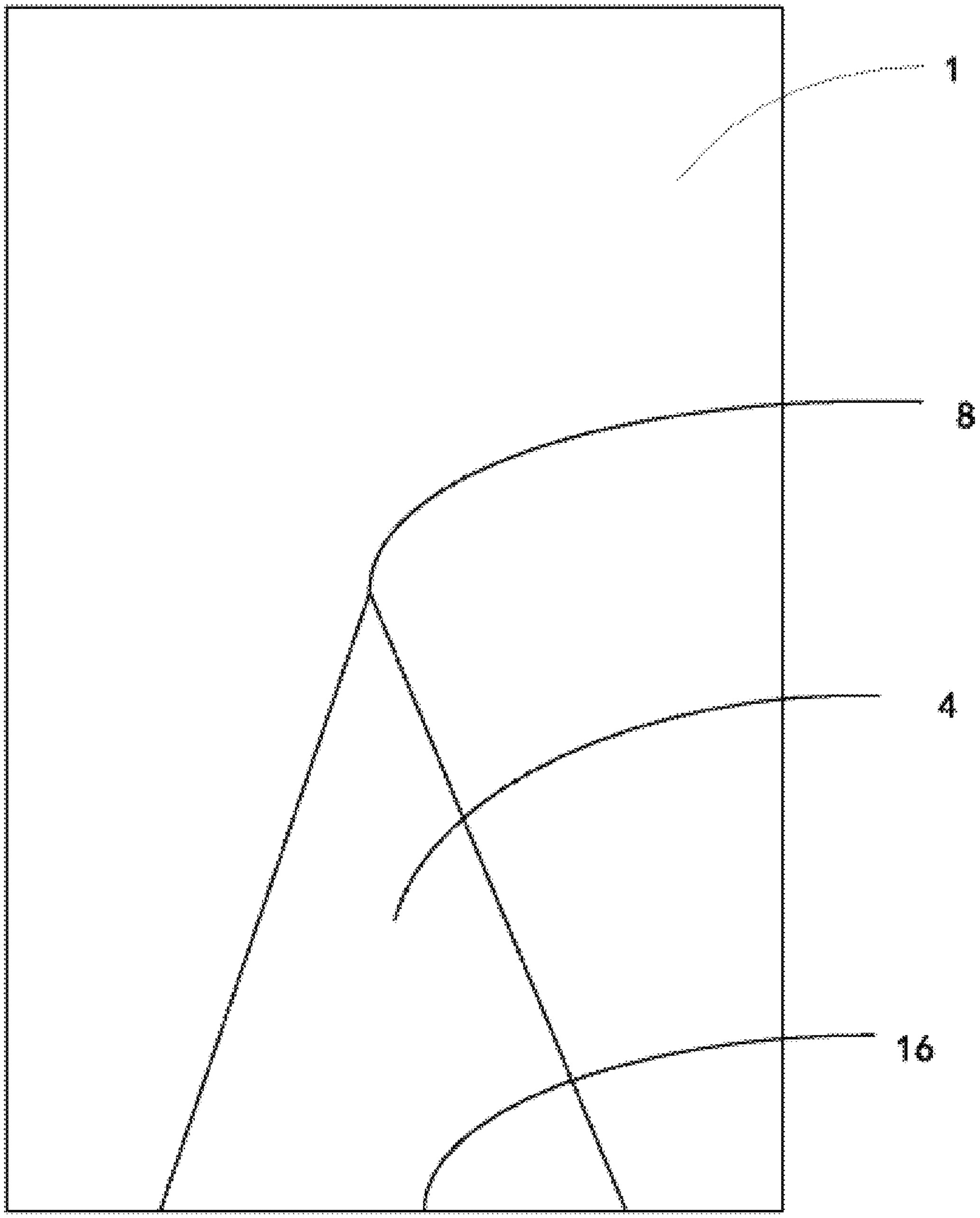
FIG. 7 is a structural schematic diagram III illustrating a back surface of a dielectric substrate of an ultra-wideband antenna provided in an embodiment of the disclosure.

In some embodiments, referring to FIG. 7, in the projection of the grounding plate on the front surface, the projections of the contour lines from the first location to the two sides of the tail part 16 are both straight lines. It should be noted that absolute values of slopes of the two straight lines may either be equal or different.

Figure 8:
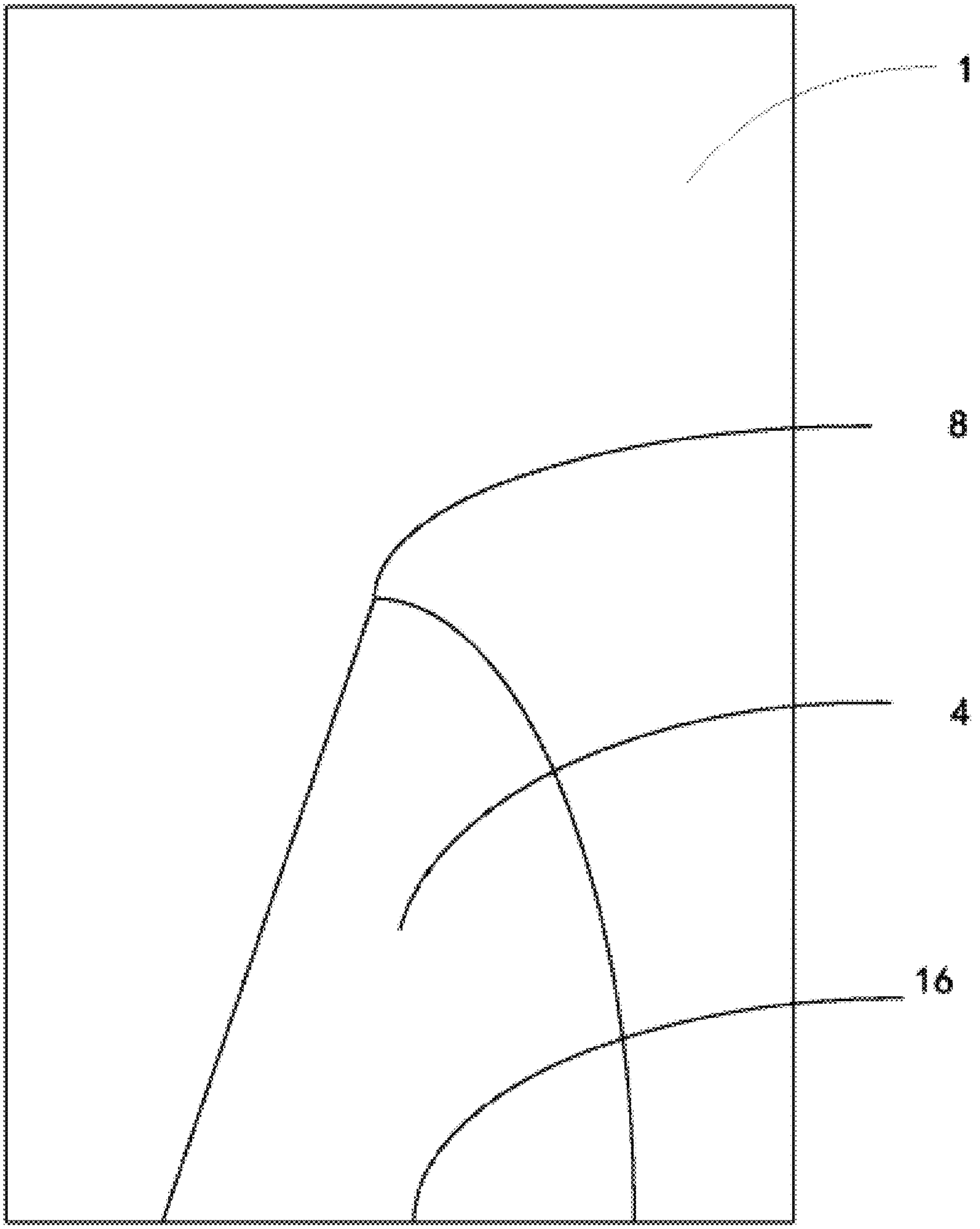
FIG. 8 is a structural schematic diagram IV illustrating a back surface of a dielectric substrate of an ultra-wideband antenna provided in an embodiment of the disclosure.

In some embodiments, referring to FIG. 8, in the projection of the grounding plate on the front surface, one of the projections of the contour lines from the first location to the two sides of the tail part 16 is a straight line, and the other one is a curve.

In some embodiments, referring to FIG. 1 and FIG. 5 to FIG. 10, the first location 8 may be a point on the grounding plate 4 that is farthest away from the bottom.

Figure 11:
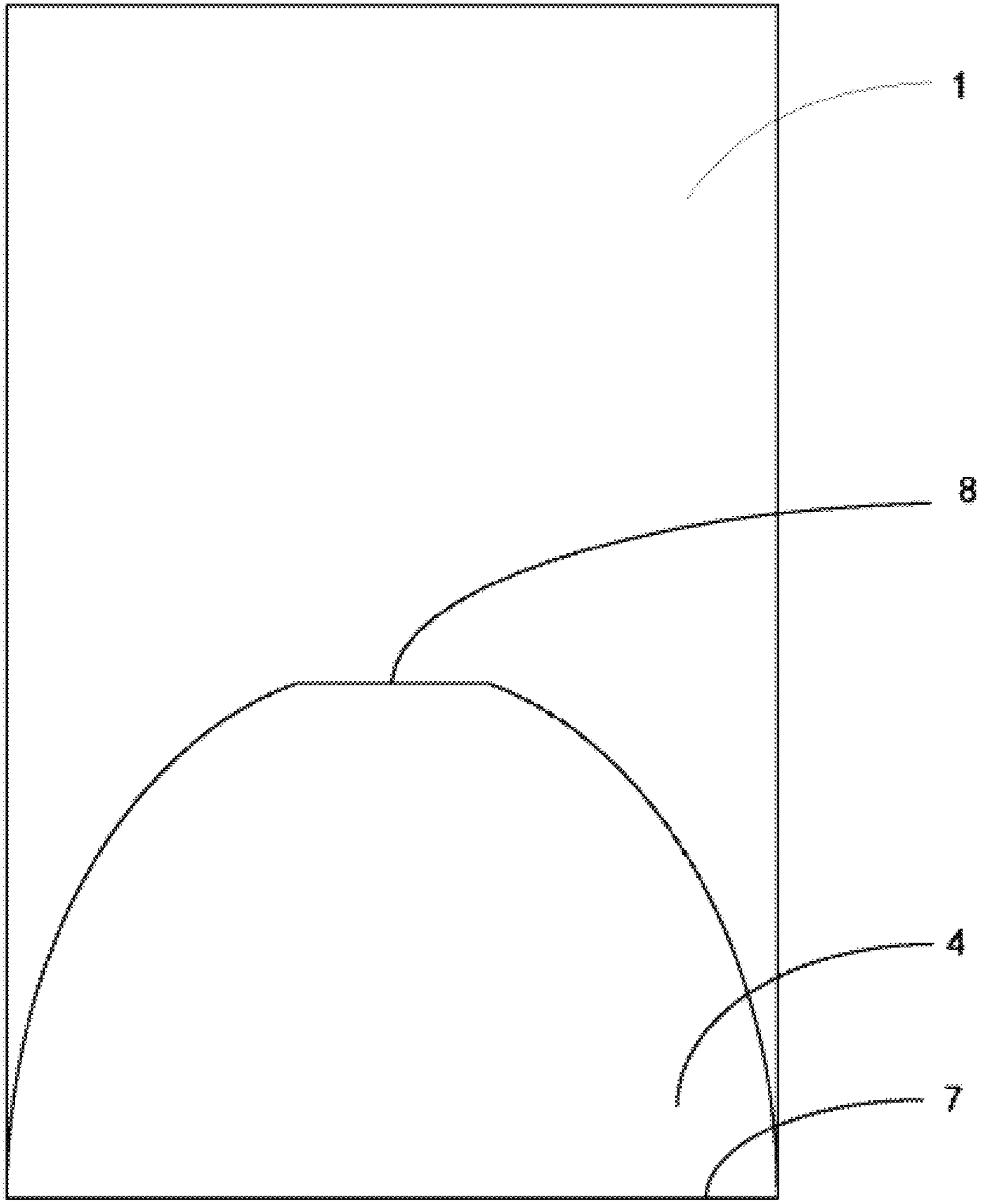
FIG. 11 is a structural schematic diagram VII illustrating a back surface of a dielectric substrate of an ultra-wideband antenna provided in an embodiment of the disclosure.
Figure 12:
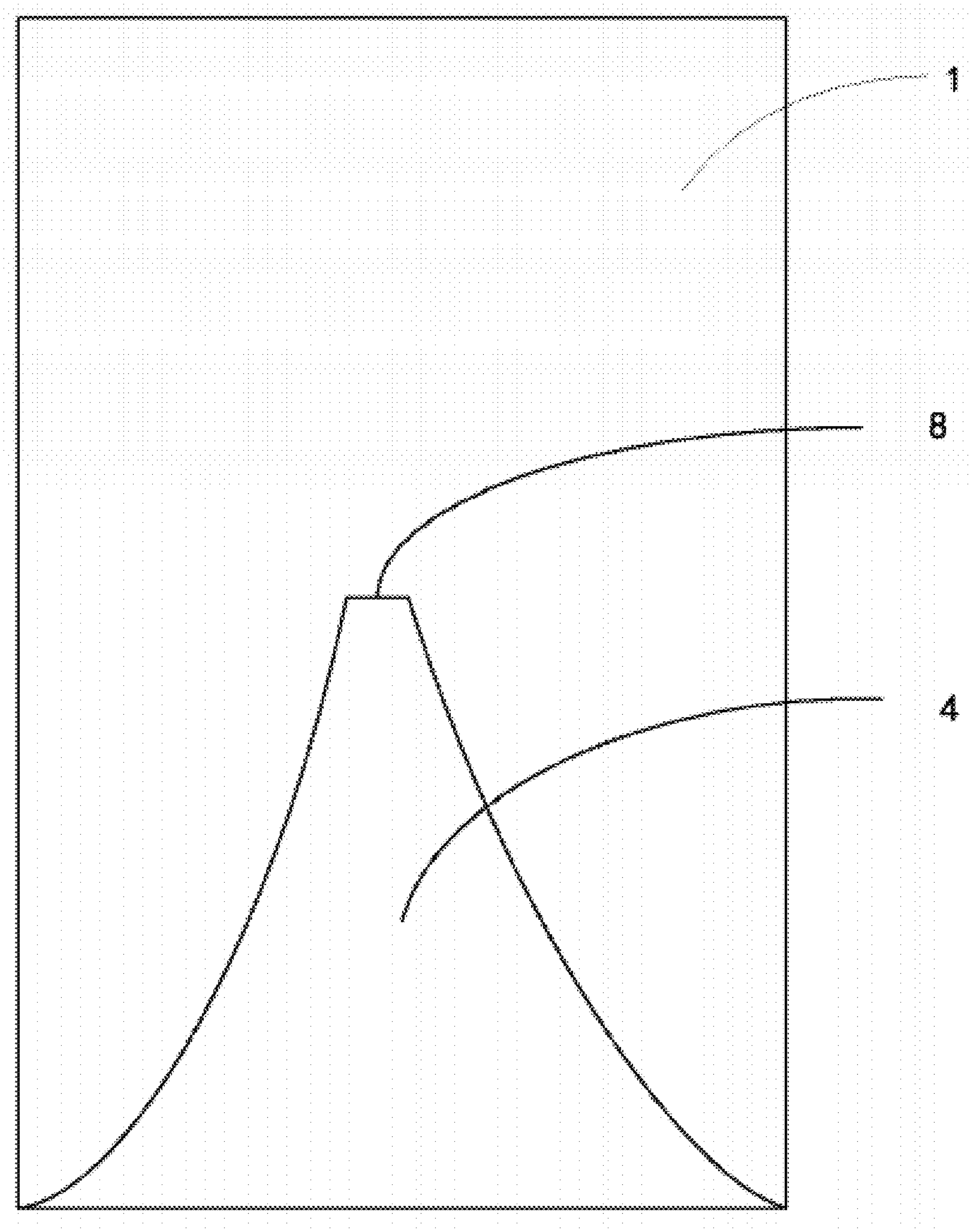
FIG. 12 is a structural schematic diagram VIII illustrating a back surface of a dielectric substrate of an ultra-wideband antenna provided in an embodiment of the disclosure.

In some embodiments, referring to FIG. 11 and FIG. 12, the first location 8 is a surface of the ground plate 4 that is farthest away from the bottom.

Figure 13:
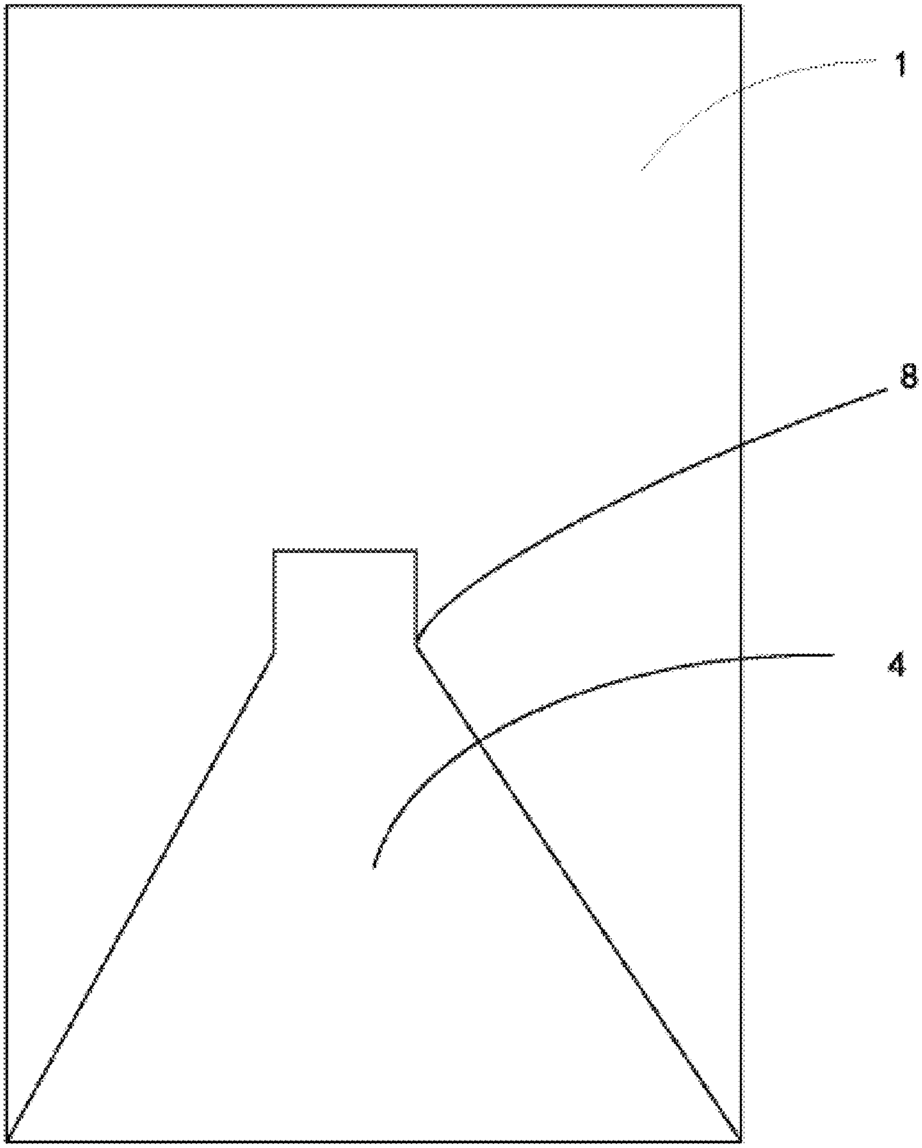
FIG. 13 is a structural schematic diagram IX illustrating a back surface of a dielectric substrate of an ultra-wideband antenna provided in an embodiment of the disclosure.
Figure 14:
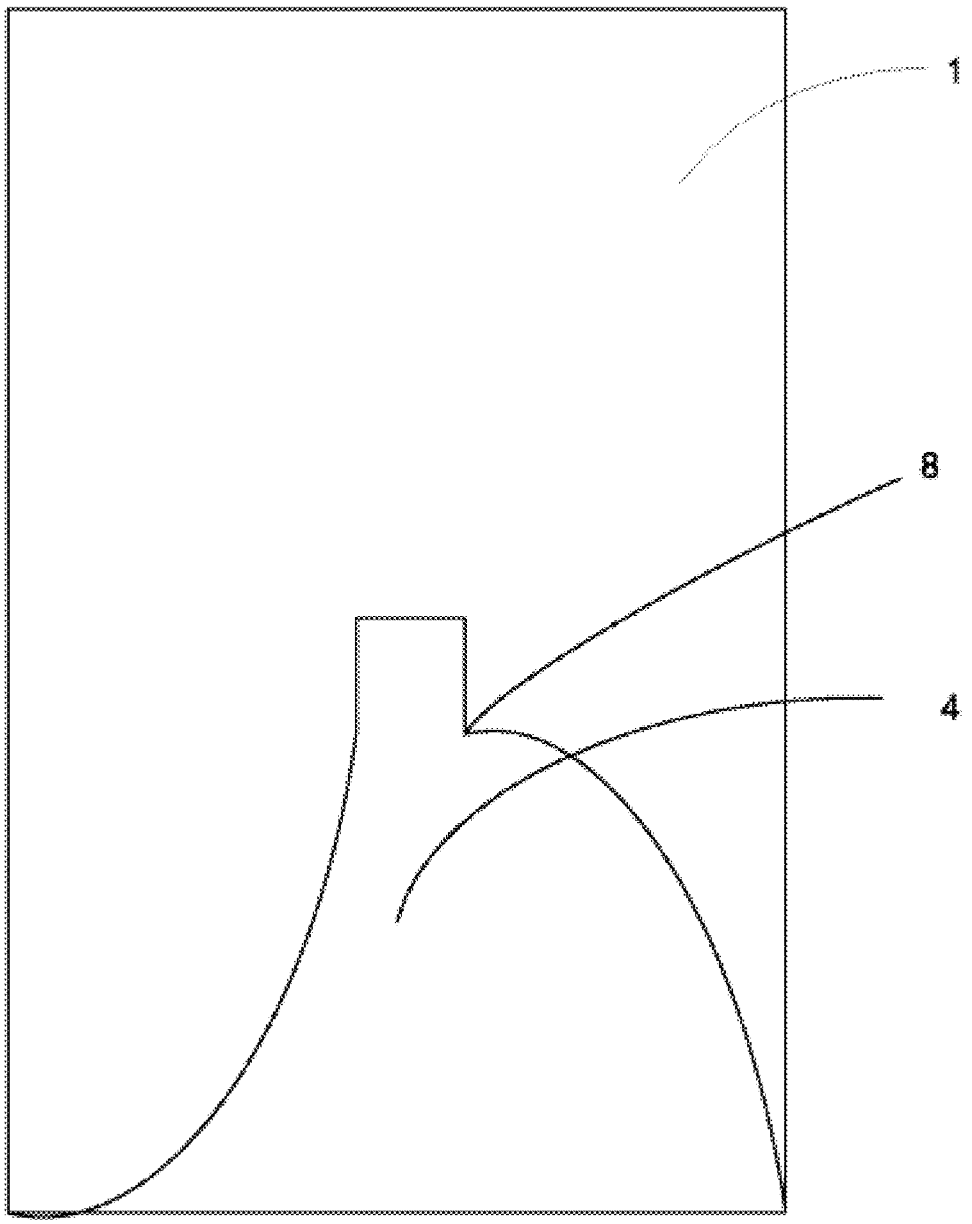
FIG. 14 is a structural schematic diagram X illustrating a back surface of a dielectric substrate of an ultra-wideband antenna provided in an embodiment of the disclosure.

In some embodiments, referring to FIG. 13 and FIG. 14, the grounding plate may first extend along an extension direction of the microstrip line feed unit with the same cross section as that of the microstrip line feed unit, and then expand and extend. In this case, the first location may also be located at a position where the grounding plate starts to expand and extend.

It should be noted that those skilled in the art would configure, according to requirements, the structure of the grounding plate to be another structure that gradually expands from the first location to the tail part according to an exponential function.

Figure 15:
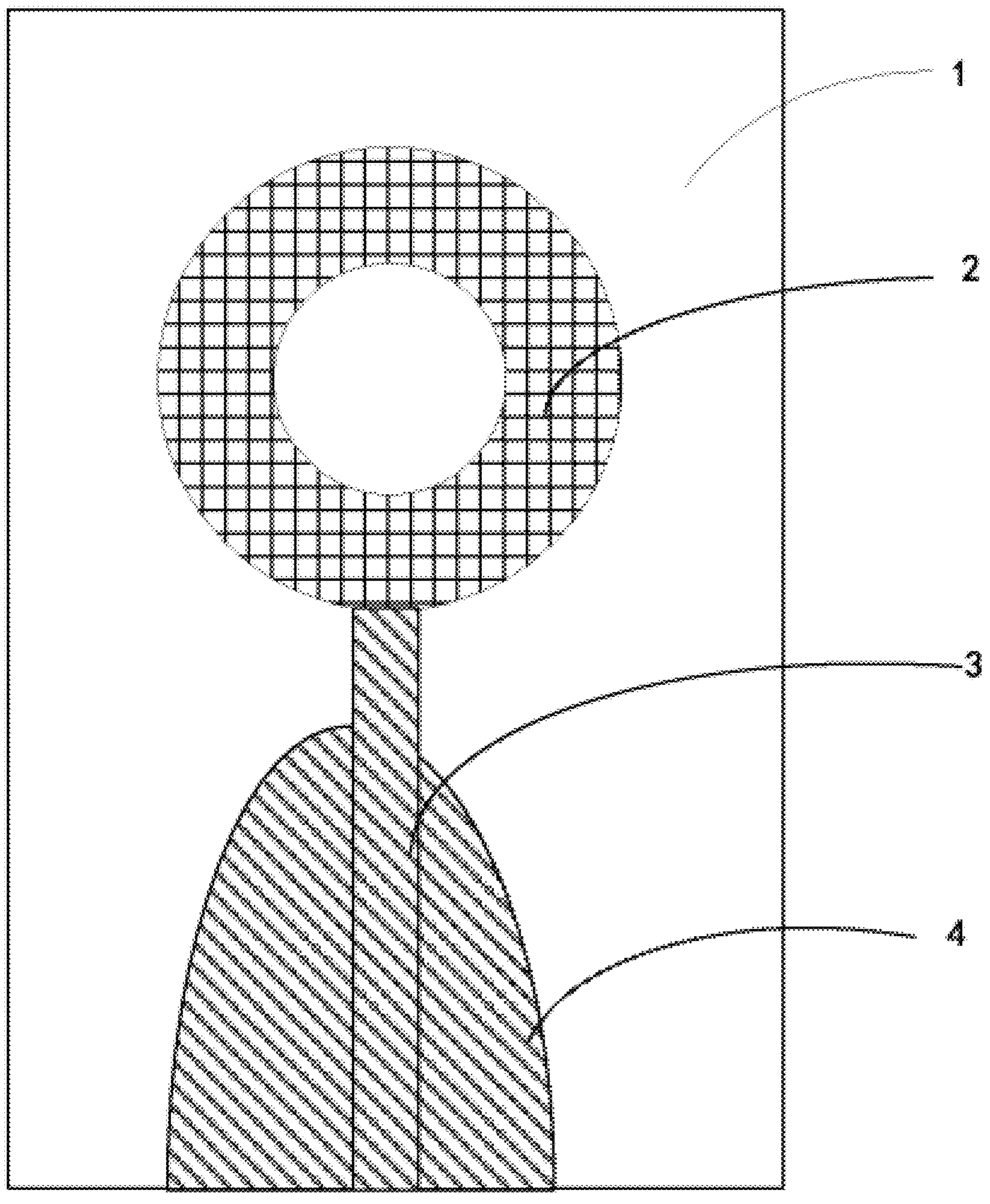
FIG. 15 is a structural perspective view II of an ultra-wideband antenna provided in an embodiment of the disclosure.

In some embodiments, referring to FIG. 15 and FIG. 1, in the case that the preset location includes the first location located on the grounding plate, the microstrip line feed unit 3 may either be configured to expand as shown in FIG. 1, or be configured to have a constant cross section as shown in FIG. 15. The structure of the microstrip line feed unit may also be other shapes known by those skilled in the art.

Figure 16:
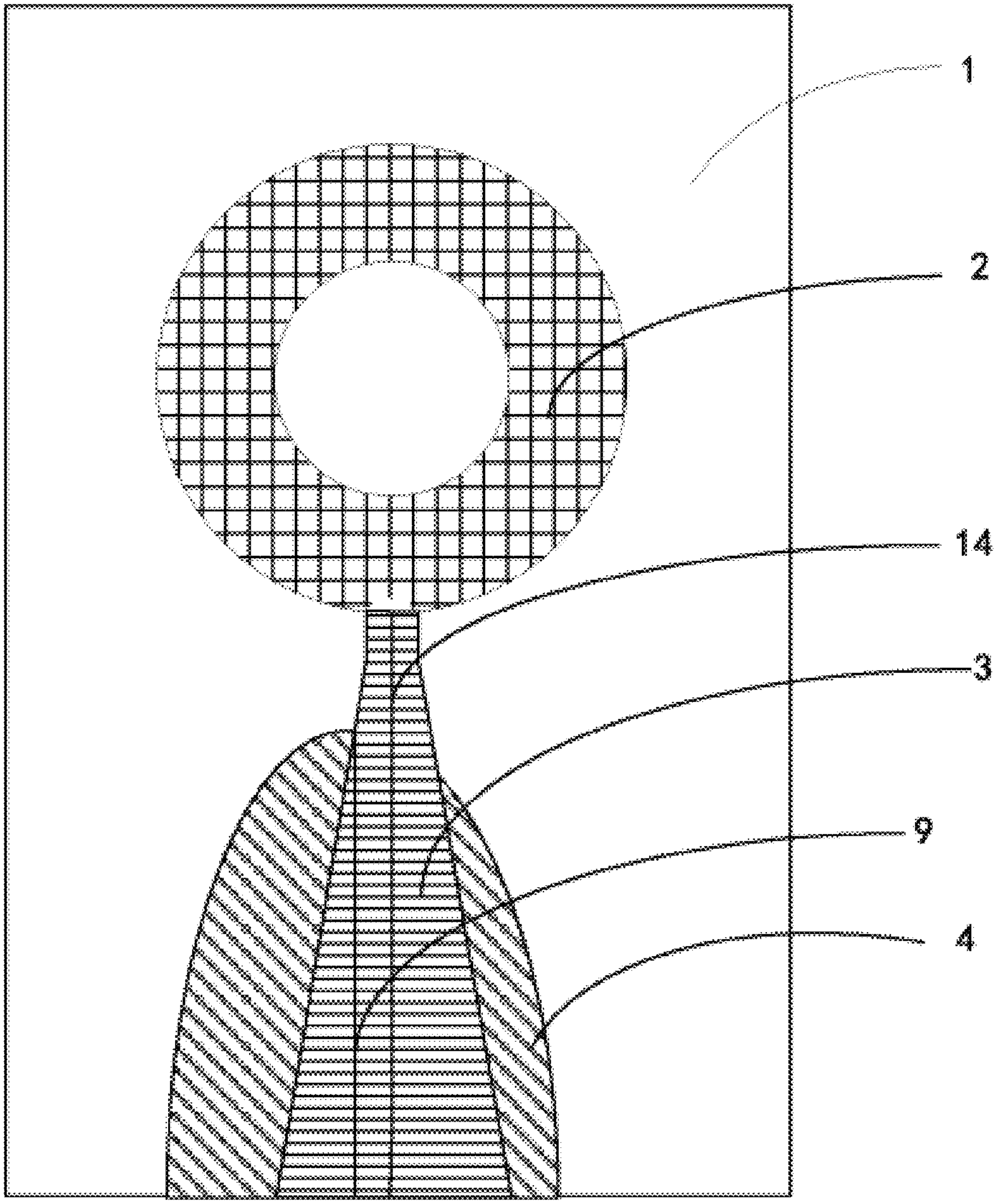
FIG. 16 is a structural perspective view III of an ultra-wideband antenna provided in an embodiment of the disclosure.

In some embodiments, referring to FIG. 16, a projection of an axis 9 of the grounding plate 4 on the front surface is within a region where the microstrip line feed unit 3 is located. The standing wave ratio within the band and the radiation pattern of an antenna can be improved, thereby widening the working bandwidth of the antenna.

In some embodiments, further referring to FIG. 16, the grounding plate 4 is configured about the axis 9 of the grounding plate. That is, in this case, the projection region of the grounding plate 4 on the front surface is of a symmetric shape, and the projection of the axis 9 of the grounding plate on the front surface coincides with a symmetry axis of the projection of the grounding plate 4 on the front surface. The standing wave ratio within the band and the radiation pattern of the antenna can be improved, thereby widening the working bandwidth of the antenna. It should be noted that, in the embodiment, the shape of the dielectric substrate is not limited.

Figure 17:
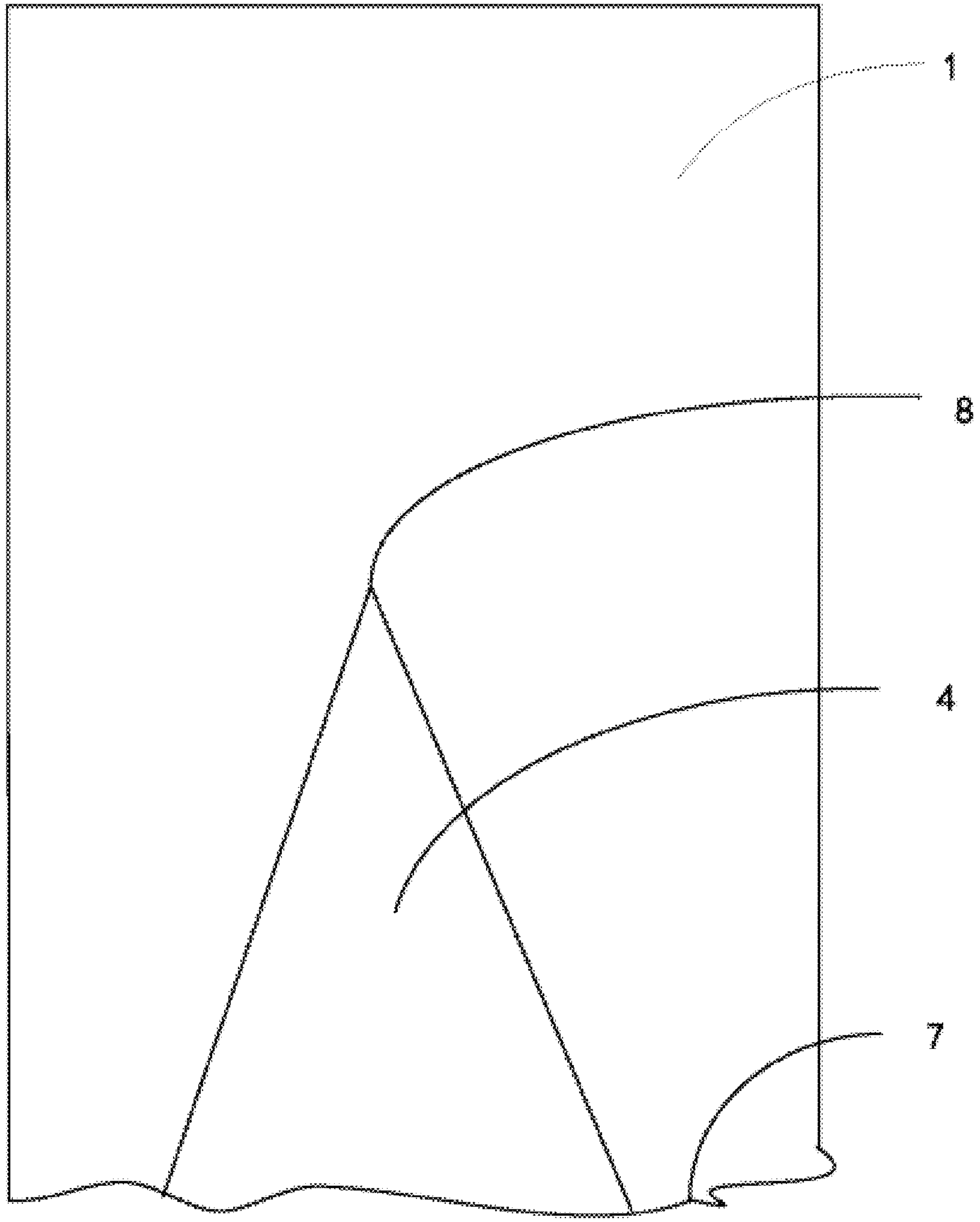
FIG. 17 is a structural schematic diagram XI illustrating a back surface of a dielectric substrate of an ultra-wideband antenna provided in an embodiment of the disclosure.

In some embodiments, referring to FIG. 17, the bottom 7 is not a straight line. In this case, the contour lines on two sides of the projection of the grounding plate on the front surface are lengthened to the same plane according to an extending tendency thereof to obtain a pattern, a symmetry axis of which is taken as the projection of the axis of the grounding plate on the front surface. The symmetry axis of the projection of the microstrip line feed unit on the front surface can also be obtained by using a similar method.

According to the ultra-wideband antenna of the embodiments of the disclosure, at least a part of the feed unit is configured to expand and extend toward the bottom, that is, at least one of the grounding plate and the microstrip line feed unit is configured to expand and extend, such that the standing wave ratio within the band and the radiation pattern of the antenna can be improved, thereby widening the working bandwidth of the antenna.

In some embodiments, the microstrip line feed unit includes a first feed-in part and a second feed-in part. An initial end of the first feed-in part is electrically connected to the main radiation unit, a first connection end of the first feed-in part is electrically connected to a second connection end of the second feed-in part, and the preset location includes the second connection end. The second feed-in part is configured to expand from the second connection end to the terminal end.

Referring to FIG. 3, the microstrip line feed unit includes the first feed-in part 10 and the second feed-in part 11. The initial end 5 of the first feed-in part 10 is electrically connected to the main radiation unit 2, the first connection end of the first feed-in part 10 is electrically connected to the second connection end of the second feed-in part 11, the terminal end 6 of the second feed-in part 11 extends to the bottom 7 of the dielectric substrate, and the preset location includes the second connection end. The second feed-in part 11 is configured to gradually expand from the second connection end to the terminal end 6. As shown in FIG. 3, the location indicated by 12 is an interface location between the first connection end and the second connection end.

In some embodiments, the first feed-in part is a small segment of feed line, and is used for realizing a connection between the main radiation unit and the second feed-in part.

In some embodiments, a cross section of the first connection end is the same as that of the second connection end in shape and size, and the first feed-in part and the second feed-in part are integrally formed.

In some embodiments, the terminal end of the second feed-in part is a radio frequency signal feed-in point.

Figure 18:
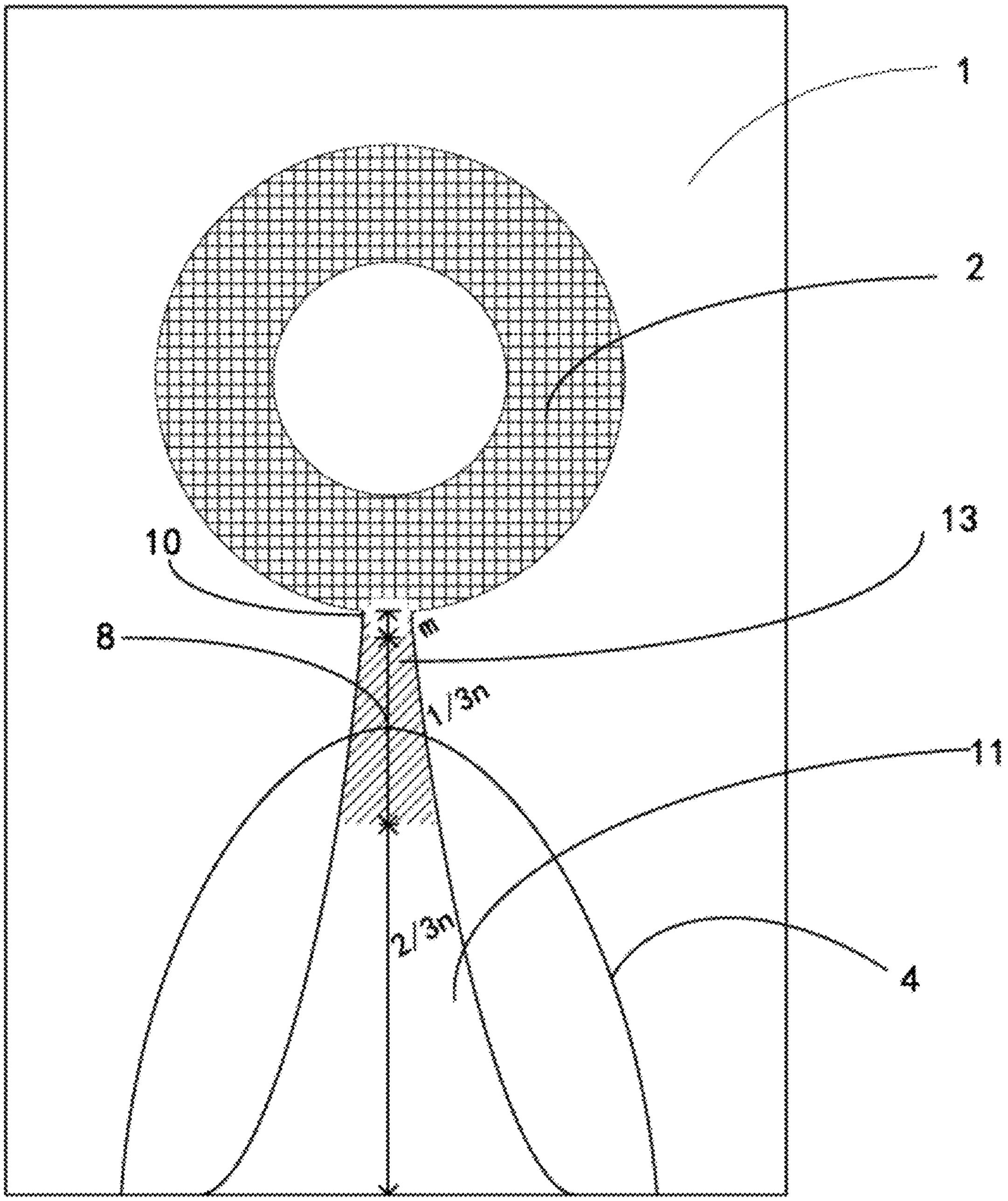
FIG. 18 is a structural perspective view IV of an ultra-wideband antenna provided in an embodiment of the disclosure.

In some embodiments, referring to FIG. 18, the projection of the second feed-in part 11 on the front surface may also be of the shape as shown in FIG. 12. The contour of the projection of the second feed-in part 11 on the front surface is a curve. Those skilled in the art would configure, according to actual requirements, the shape of the second feed-in part in such a way that the second feed-in part gradually expands from the second connection end to the terminal end.

It should be noted that the projection of the second feed-in part on the front surface may be either symmetric or asymmetric, which would have been configured by those skilled in the art according to requirements.

In some embodiments, in the projection region of the second feed-in part on the front surface, the contour lines from two sides of the second connection end to two sides of the terminal end are straight lines.

In some embodiments, the projection of the axis of the grounding plate on the front surface coincides with the projection of the axis of the microstrip line feed unit on the front surface. The standing wave ratio in the band and the radiation pattern of an antenna can be improved, thereby widening the working bandwidth of the antenna.

In some embodiments, further referring to FIG. 18, the projection of the first location 8 on the front surface is located in a preset region 13, the preset region 13 is a region where a preset length of the microstrip line feed unit 3 started from the initial end is located, and the preset length is a sum of the length m of the first feed-in part 10 and one third of the length n of the second feed-in part 11.

In some embodiments, further referring to FIG. 3, the projection of the micro strip line feed unit 3 on the front surface is symmetric.

In some embodiments, further referring to FIG. 18, in the case that the projection of the grounding plate 4 on the front surface is symmetric, the symmetry axis of the projection of the grounding plate on the front surface coincides with the symmetry axis of the projection of the microstrip line feed unit 3 on the front surface.

In some embodiments, further referring to FIG. 16, in the case that the projection of the grounding plate 4 on the front surface is symmetric, the symmetry axis of the projection of the grounding plate 4 on the front surface, i.e. the projection of the axis 9 of the grounding plate on the front surface, is parallel to the symmetry axis 14 of the projection of the microstrip line feed unit on the front surface. The standing wave ratio in the band and the radiation pattern of the antenna can be improved, thereby widening the working bandwidth of the antenna.

Figure 19:
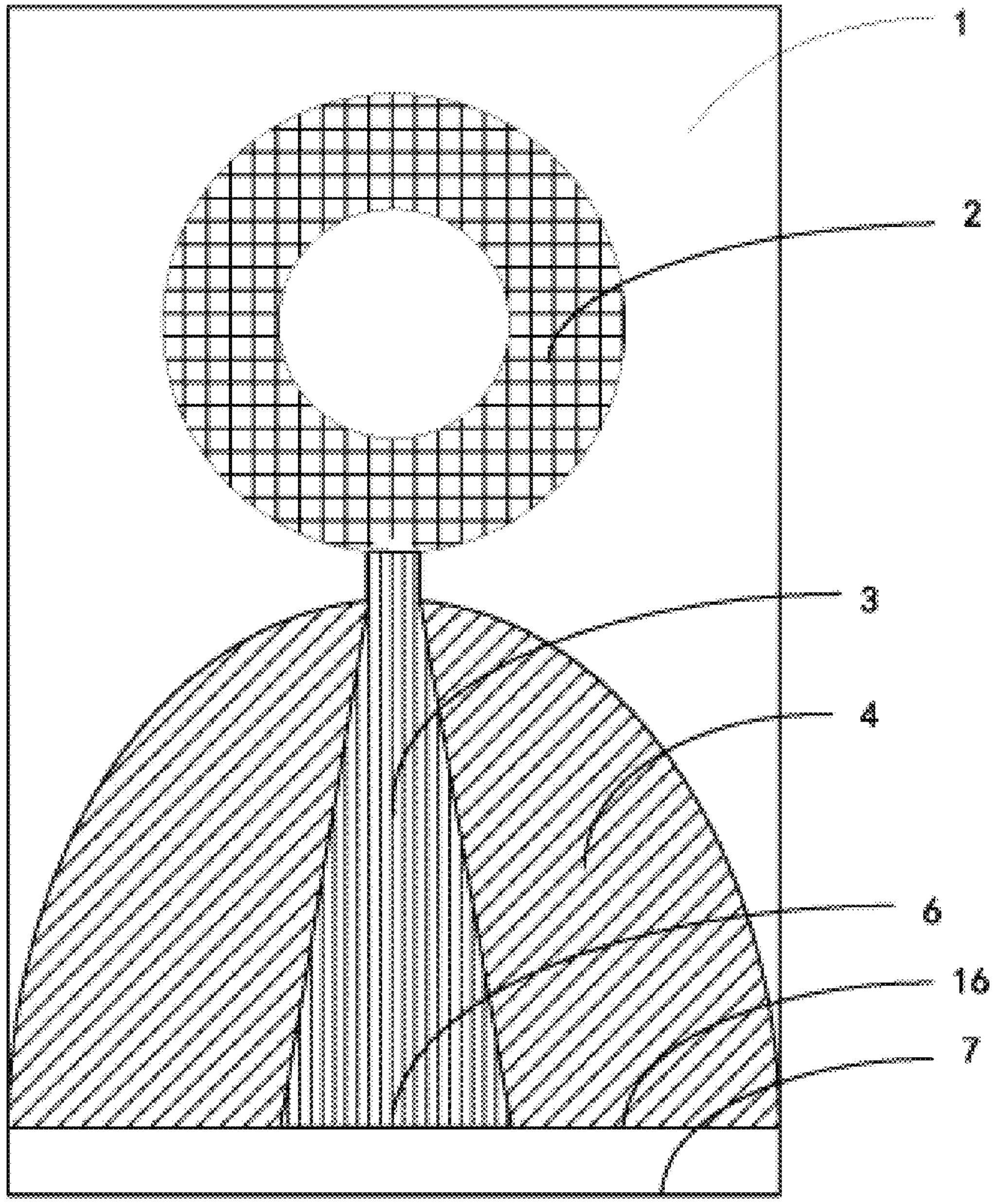
FIG. 19 is a structural perspective view V of an ultra-wideband antenna provided in an embodiment of the disclosure.
Figure 20:
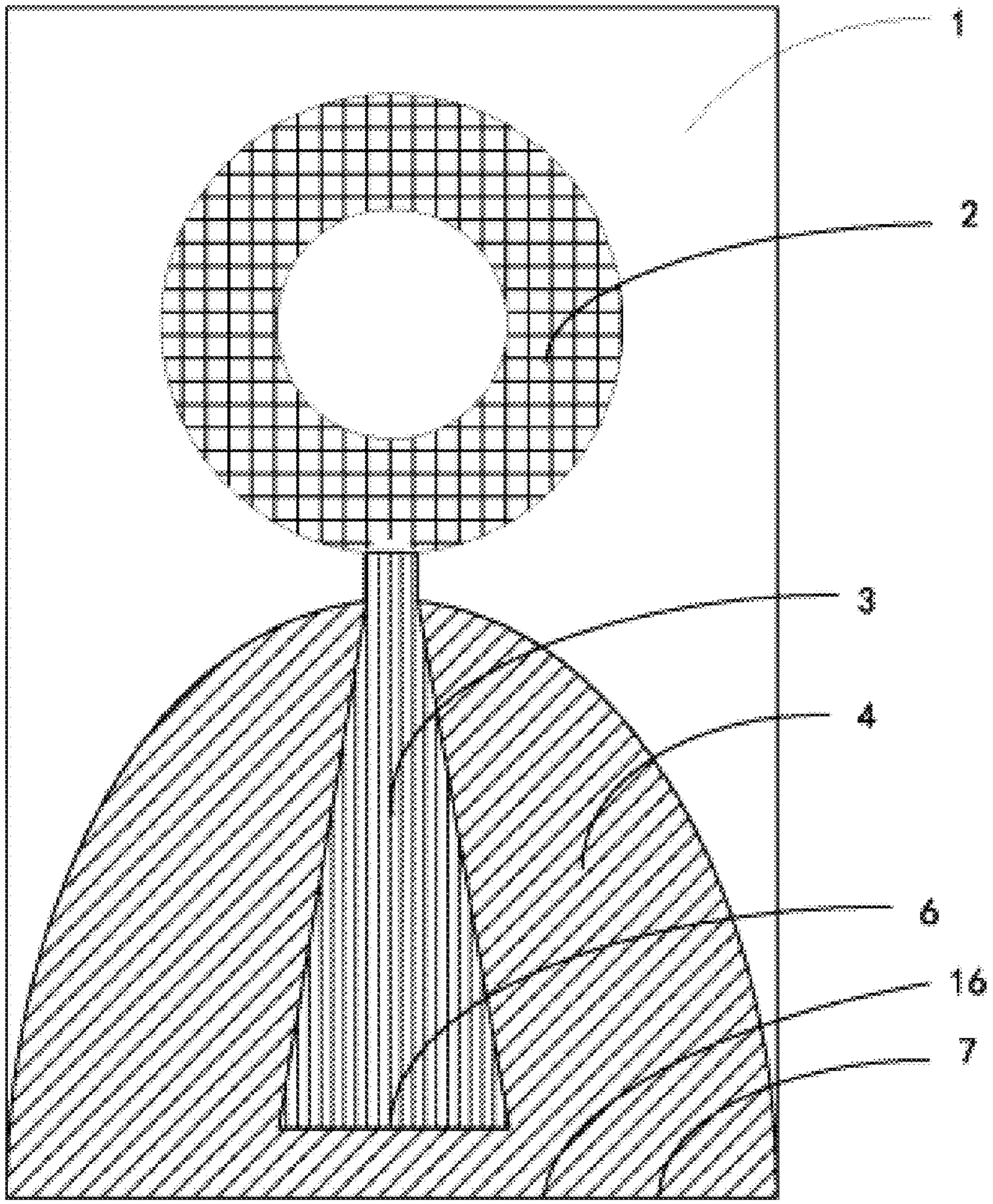
FIG. 20 is a structural perspective view VI of an ultra-wideband antenna provided in an embodiment of the disclosure.
Figure 21:
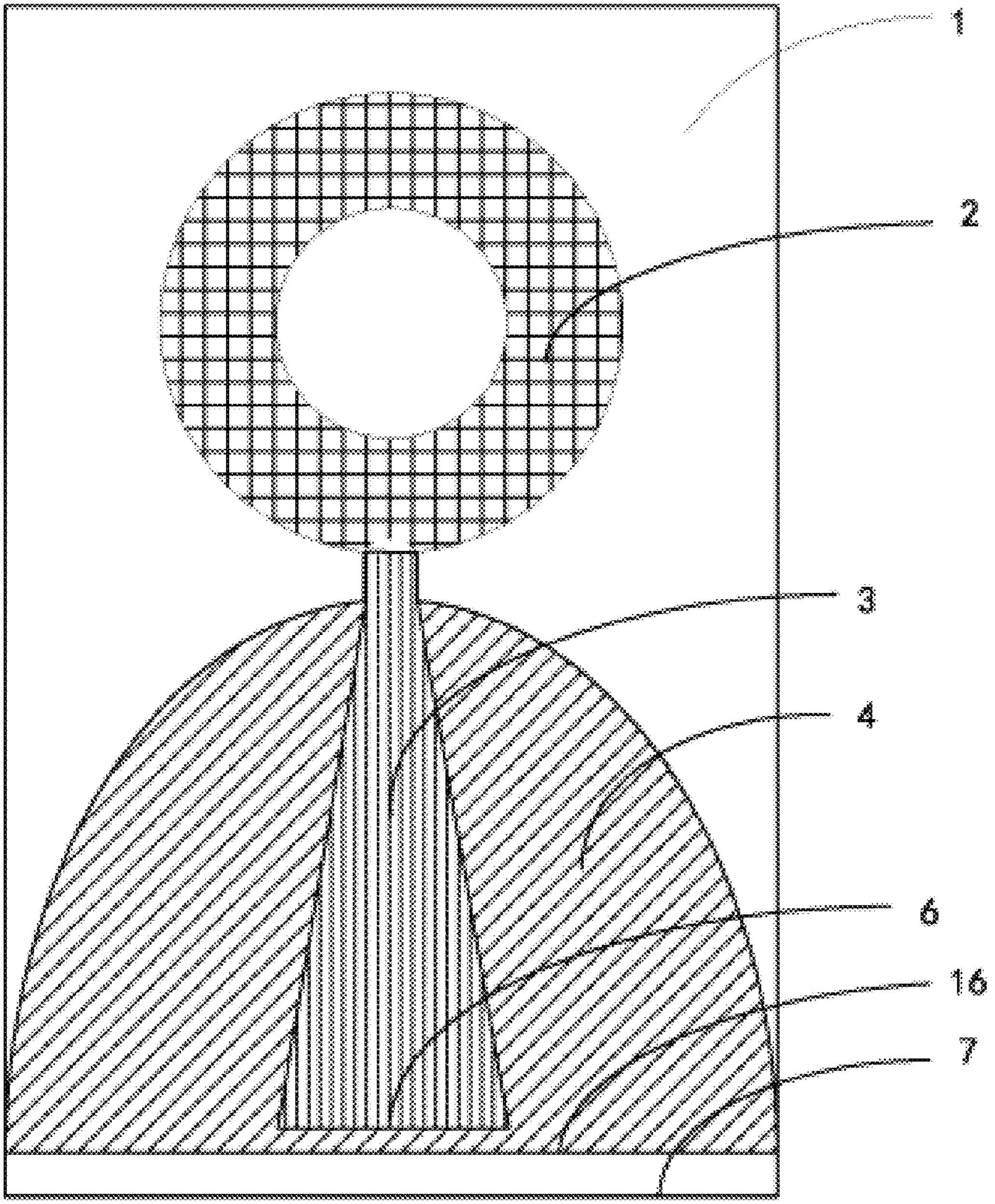
FIG. 21 is a structural perspective view VII of an ultra-wideband antenna provided in an embodiment of the disclosure.
Figure 22:
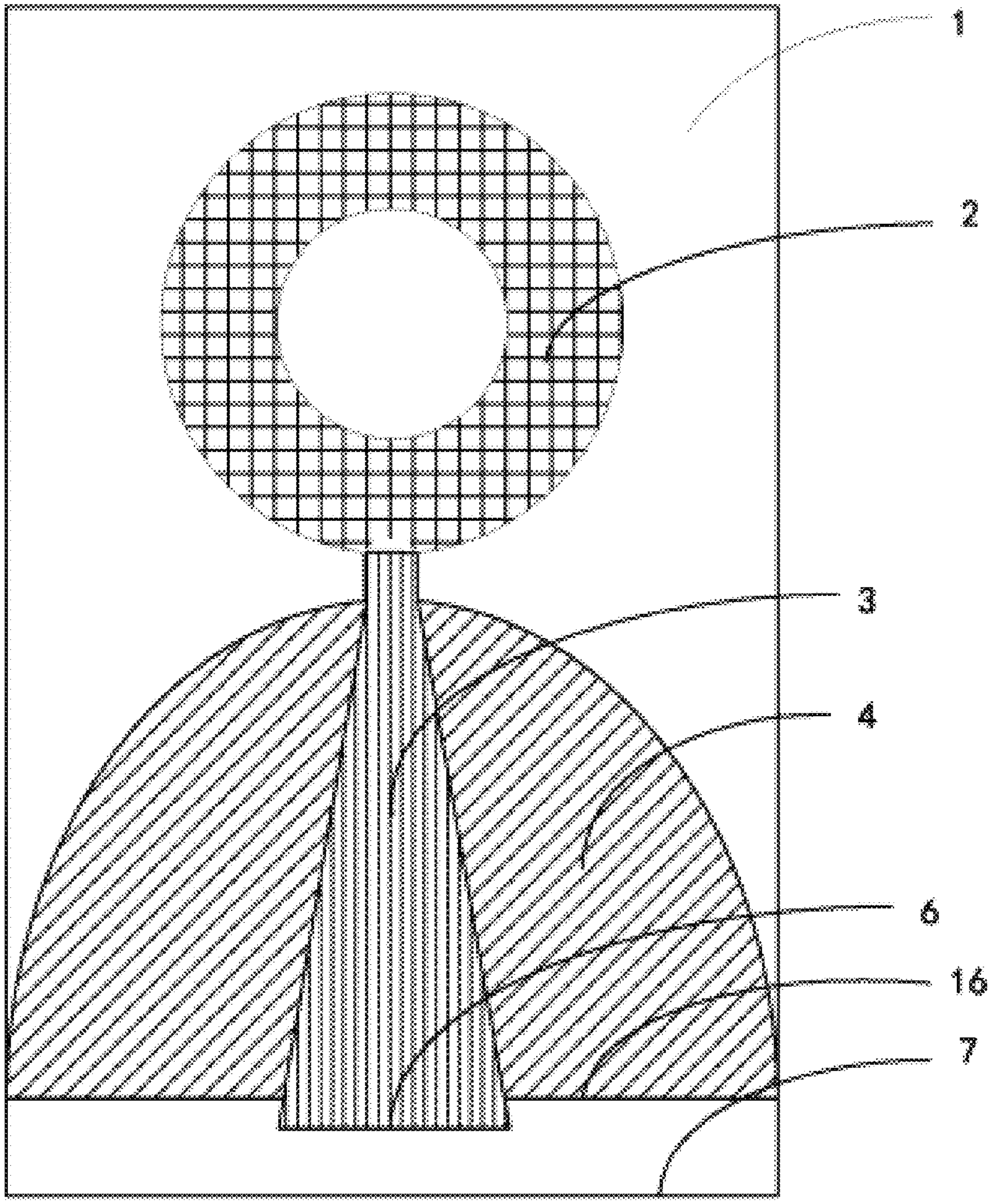
FIG. 22 is a structural perspective view VIII of an ultra-wideband antenna provided in an embodiment of the disclosure.

In some embodiments, referring to FIG. 19, the microstrip line feed unit 3 can extend to a location above the bottom 7, that is, the terminal end 6 of the microstrip line feed unit 3 is above the bottom 7. In this case, referring to FIG. 20, the grounding plate 4 can extend to the bottom 7, that is, the tail part 16 of the grounding plate 4 is flush with the bottom 7 of the dielectric substrate 1; or, referring to FIG. 21, the grounding plate 4 can extend to a location that is above the bottom 7 and below the projection of the terminal end 6 of the microstrip line feed unit 3 on the back surface, that is, when the grounding plate is projected on the front surface, the tail part 16 of the grounding plate 4 is located between the bottom 7 of the dielectric substrate and the terminal end 6 of the microstrip line feed unit 3; or, referring to FIG. 22, the grounding plate 4 can extend to a location that is above the bottom 7 and above the projection of the terminal end 6 of the microstrip line feed unit on the back surface, that is, when the grounding plate is projected on the front surface, the tail part 16 of the grounding plate 4 is located above the terminal end 6 of the micro strip line feed unit 3; or, referring to FIG. 19, the grounding plate 4 can extend to a location that is above the bottom 7 and is flush with the projection of the terminal end 6 of the microstrip line feed unit on the back surface, that is, when the grounding plate is projected on the front surface, the tail part 16 of the grounding plate 4 is flush with the terminal end of the microstrip line feed unit 3.

In the ultra-wideband antenna provided in the embodiments of the disclosure, the grounding plate in the feed unit is configured in such a way that at least a part of the grounding plate expands from a preset location to the bottom, the size of the grounding plate can be configured to be smaller than the size of the grounding plate in the related art. The structure of the grounding plate is simple, and the corresponding microstrip line feed unit can be easily machined.

In some embodiments, the ultra-wideband antenna is manufactured by using an integrally forming technique.

According to the ultra-wideband antenna provided in the embodiments, the main radiation unit and the microstrip line feed unit are arranged on the front surface of the dielectric substrate, the initial end of the microstrip line feed unit is electrically connected to the main radiation unit, and the terminal end of the microstrip line feed unit extends to the bottom of the dielectric substrate. The grounding plate is arranged on the back surface of the dielectric substrate that is opposite to the front surface, and the grounding plate serves as a reference ground of the microstrip line feed unit. The grounding plate is located below the projection region of the main radiation unit on the back surface, at least a part of the projection region of the microstrip line feed unit on the back surface coincides with the region where the grounding plate is located, and the projection region of the terminal end on the back surface is located within the region where the grounding plate is located. At least a part of the feed unit is configured to expand from a preset location to the bottom. By configuring at least a part of the feed unit to expand and extend toward the bottom, that is, configuring at least one of the grounding plate and the microstrip line feed unit to expand and extend, the passband standing wave ratio and radiation pattern of the antenna can be improved, thereby widening the working bandwidth of the antenna. Moreover, in the ultra-wideband antenna provided in the embodiments of the present disclosure, when the grounding plate in the feed unit is configured in such a way that at least a part of the grounding plate expands from the preset location to the bottom, the size of the grounding plate can be configured to be smaller than the size of the grounding plate in the related art, the structure is simple, and the corresponding microstrip line feed unit can be easily machined.

The implementation of the technical solution in the embodiments will be further described in details below by using one specific application example.

Figure 23:
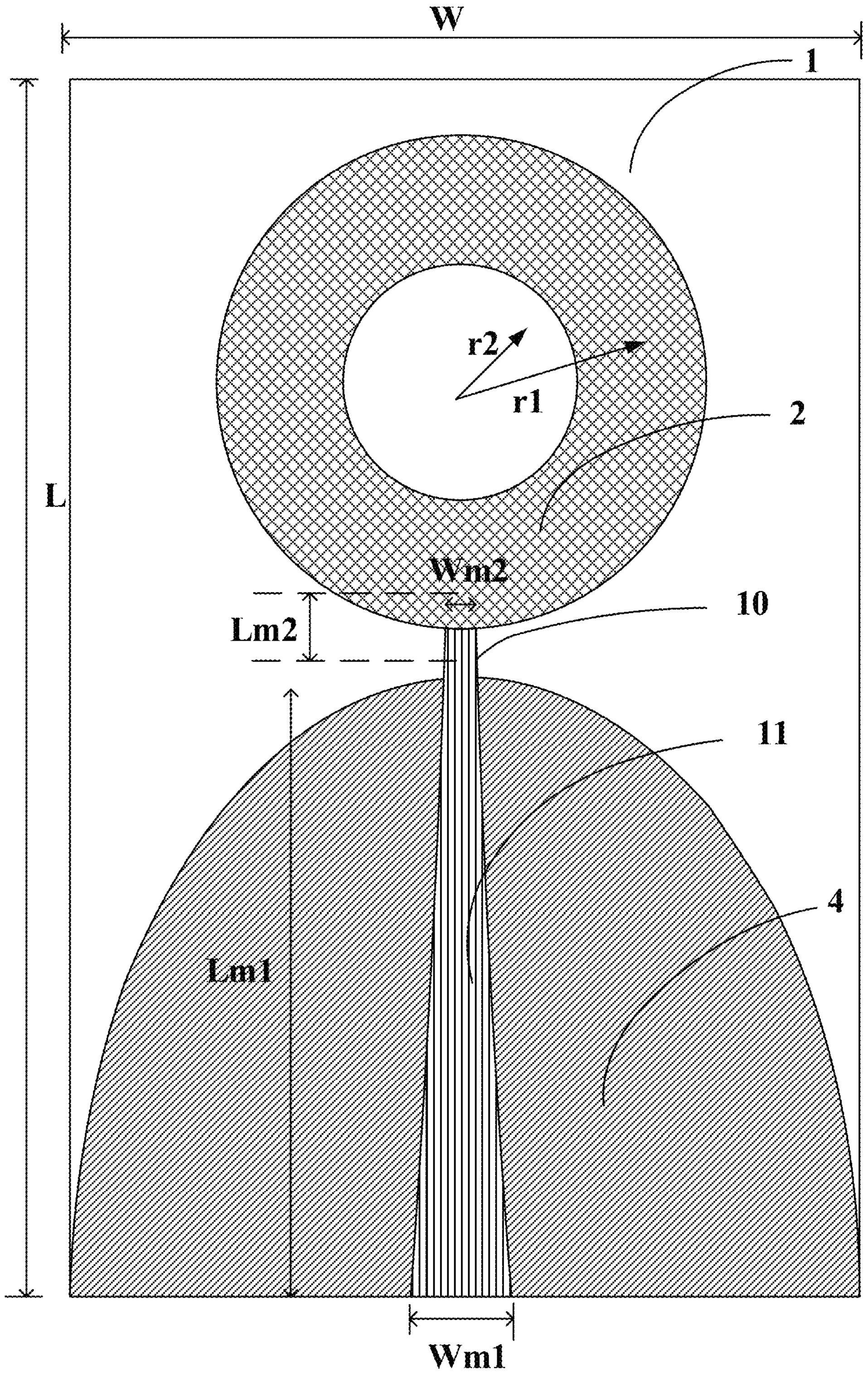
FIG. 23 is a structural perspective view IX of an ultra-wideband antenna provided in an embodiment of the disclosure.

FIG. 23 is a perspective view of an ultra-wideband antenna on the front surface of a dielectric substrate. Referring to FIG. 23, the ultra-wideband antenna includes a dielectric substrate 1, a main radiation unit 2, a first feed-in part 10, a second feed-in part 11 and a grounding plate 4.

The dielectric constant of the dielectric substrate 1 is 4.4, and the dimension of the dielectric substrate 1 is: a length L of 100 mil, a width W of 800 mil and a thickness of 60 mil.

The main radiation unit 2 has an annulus structure printed on the front surface of the dielectric substrate 1, and a radius r1 of the annulus structure is 250 mil, and a radius r2 of the annulus structure is 120 mil.

The first feed-in part 10 has an initial end connected to the main radiation unit 2 and a first connection end connected to the second feed-in part 11. The length Lm2 of the first feed-in part 10 is 40 mil, and the width Wm2 of the first feed-in part 10 is 28 mil.

The second feed-in part 11 has a second connection end connected to the first connection end of the first feed-in part 10, and a terminal end of the second feed-in part 11 is located at the bottom of the dielectric substrate, i.e. at an edge of the dielectric substrate. The terminal end of the second feed-in part is a radio frequency signal feed-in point. The length Lm1 of the second feed-in part is 400 mil, the width of the second connection end is the same as the width of the first connection end and is Wm2, and the width of the terminal end Wm1 is 100 mil.

The grounding plate 4, which is printed on the back surface of the dielectric substrate and located directly below the second feed-in part 11, is a reference ground of the second feed-in part 11, and is bilaterally symmetric, where the width thereof from bottom to top changes gradually, the width W of the lower part is the same as that of the dielectric substrate 1, and the length Lm1 of the grounding plate is the same as that of the second feed-in part 11.

Figure 24:
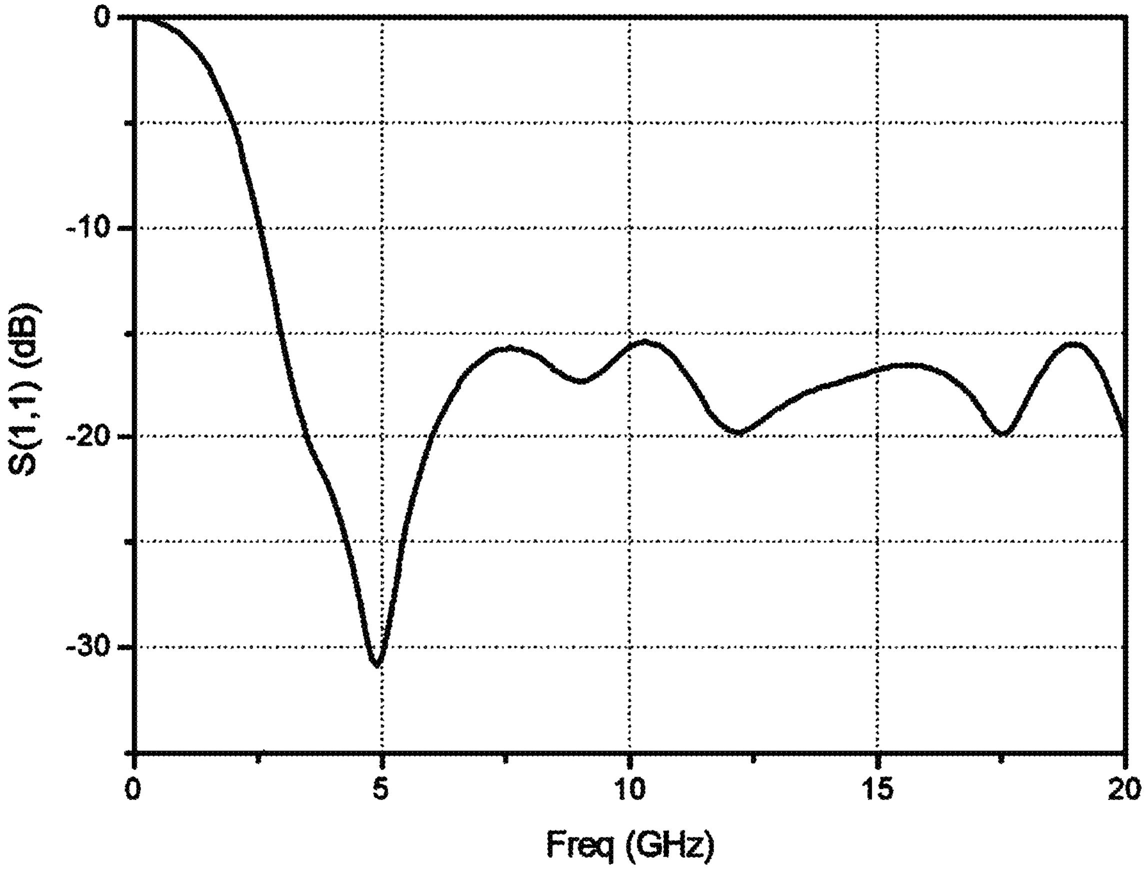
FIG. 24 is a diagram illustrating a test result S (1, 1) of an ultra-wideband antenna provided in an embodiment of the disclosure.

Through experiments, FIG. 24 illustrates a test result S (1, 1) of the ultra-wideband antenna in FIG. 23. Referring to FIG. 24, a horizontal axis relates to the working frequency of the ultra-wideband antenna. As can be seen from FIG. 24, when the working frequency of the ultra-wideband antenna is in a range of 3 GHz to 20 GHz, the S (1,1) of is less than −15 dB, the peak gain thereof is within a range of −1.8 dBi to 5.5 dBi, and the radiation efficiency thereof is greater than 79%.

It should be noted that the above size of the ultra-wideband antenna is merely for illustration, those skilled in the art would have been able to select a suitable size according to requirements, and the size of each component is not limited herein.

By configuring the shape of the grounding plate to change gradually according an exponential function, the passband standing wave ratio and radiation pattern of an antenna can be improved, thereby widening the working bandwidth of the antenna. Moreover, such grounding plate has a simpler structure and a smaller size, and can be easily machined. The second feed-in part is also configured to expand gradually from the second connection end to the terminal end according to an exponential function, which can also improve the standing wave ratio in the band and the radiation pattern of the antenna, thereby widening the working bandwidth of the antenna; and the second feed-in part has a simpler structure, and can thus be easily machined.

An embodiment of the disclosure provides a device including the ultra-wideband antenna according to any one of the embodiments described above.

In some embodiments, the device includes any one of a mobile phone, a router, a wearable device, a positioning device and an ultra-wideband communication device.

In some embodiments, the device can be used for positioning, but not limited thereto.

It should be noted that, in order to avoid redundancy of description, not all the examples in the embodiments are completely illustrated herein, and it should be understood that all the examples in the embodiments are applicable to this embodiment.

By configuring the shape of the grounding plate of the ultra-wideband antenna in the device to gradually change according to an exponential function, the standing wave ratio in the band and the radiation pattern of an antenna can be improved, thereby widening the working bandwidth of the antenna. Moreover, such grounding plate has a simpler structure and a smaller size, and can be easily machined. The second feed-in part is also configured to gradually expand from the second connection end to the terminal end according to an exponential function, which can also improve the standing wave ratio in the band and radiation pattern of the antenna, thereby widening the working bandwidth of the antenna; and the second feed-in part has a simpler structure, and can thus be easily machined, thereby reducing the positional occupancy of the ultra-wideband antenna in the device.

Some embodiments of the disclosure are described above with reference to the accompanying drawings, and the scope of the claims of the disclosure is not limited thereby. Any modifications, equivalent replacements and improvements made by those skilled in the art without departing from the scope and essence of the disclosure shall be within the scope of the claims of the disclosure.

What is claimed is:

1. An ultra-wideband antenna, comprising:

a dielectric substrate (1);

a main radiation unit (2); and a feed unit (15), wherein the feed unit (15) comprises a microstrip line feed unit (3) and a grounding plate (4);

wherein the dielectric substrate (1) comprises a front surface and a back surface opposite to each other;

wherein the main radiation unit (2) and the microstrip line feed unit (3) are arranged on the front surface, the microstrip line feed unit (3) being electrically connected to the main radiation unit (2), and the grounding plate (4) is arranged on the back surface;

wherein at least a part of the feed unit (15) is configured to expand from a preset location to a terminal end (6) of the microstrip line feed unit (3) or a tail part (16) of the grounding plate (4);

wherein the preset location comprises a first location (8) on the grounding plate (4), and the grounding plate (4) is configured to gradually expand from the first location (8) to the tail part (16) of the grounding plate;

in a projection region of the grounding plate (4) on the front surface, projections of contour lines from the first location (8) to two ends of the tail part (16) of the grounding plate are a first curve (17) and a second curve (18) respectively, openings of the first curve (17) and the second curve (18) face toward the tail part (16) of the grounding plate (4), and the first curve (17) and the second curve (18) are bent towards a direction away from the tail part (16) of the grounding plate (4).

2. The ultra-wideband antenna according to claim 1, wherein the first location (8) is within a projection region, on the back surface, of a preset length of the microstrip line feed unit (3) in a direction from an initial end (5) of the microstrip line feed unit to the terminal end (6), and the preset length comprises one third of a length of the microstrip line feed unit.

3. The ultra-wideband antenna according to claim 1, wherein a projection of an axis (9) of the grounding plate on the front surface is in a region where the microstrip line feed unit (3) is located.

4. The ultra-wideband antenna according to claim 1, wherein the main radiation unit (2) comprises an annulus main radiation unit.

5. The ultra-wideband antenna according to claim 1, wherein the microstrip line feed unit (3) comprises a first feed-in part (10) and a second feed-in part (11); an initial end (5) of the first feed-in part (10) is electrically connected to the main radiation unit (2); a first connection end of the first feed-in part (10) is electrically connected to a second connection end of the second feed-in part (11); the preset location comprises the second connection end;

wherein the second feed-in part (11) is configured to expand from the second connection end to the terminal end (6).

6. The ultra-wideband antenna according to claim 5, wherein a projection of an axis (9) of the grounding plate on the front surface coincides with a projection of an axis of the microstrip line feed unit (3) on the front surface.

7. The ultra-wideband antenna according to claim 1, wherein at least one of two curves of projections of contour lines from the first location (8) to two sides of a bottom (7) in a projection of the grounding plate (4) on the front surface, includes at least two different curvatures.

8. A device comprising an ultra-wideband antenna, wherein the ultra-wideband antenna comprises:

a dielectric substrate (1);

a main radiation unit (2); and a feed unit (15), wherein the feed unit (15) comprises a microstrip line feed unit (3) and a grounding plate (4);

wherein the dielectric substrate (1) comprises a front surface and a back surface opposite to each other;

wherein the main radiation unit (2) and the microstrip line feed unit (3) are arranged on the front surface, the microstrip line feed unit (3) being electrically connected to the main radiation unit (2), and the grounding plate (4) is arranged on the back surface;

wherein at least a part of the feed unit (15) is configured to expand from a preset location to a terminal end (6) of the microstrip line feed unit (3) or a tail part (16) of the grounding plate (4);

wherein the preset location comprises a first location (8) on the grounding plate (4), and the grounding plate (4) is configured to gradually expand from the first location (8) to the tail part (16) of the grounding plate;

in a projection region of the grounding plate (4) on the front surface, projections of contour lines from the first location (8) to two ends of the tail part (16) of the grounding plate are a first curve (17) and a second curve (18) respectively, openings of the first curve (17) and the second curve (18) face toward the tail part (16) of the grounding plate (4), and the first curve (17) and the second curve (18) are bent towards a direction away from the tail part (16) of the grounding plate (4).

9. The device according to claim 8, wherein the first location (8) is within a projection region, on the back surface, of a preset length of the microstrip line feed unit (3) in a direction from an initial end (5) of the microstrip line feed unit to the terminal end (6), and the preset length comprises one third of a length of the microstrip line feed unit.

10. The device according to claim 8, wherein a projection of an axis (9) of the grounding plate on the front surface is in a region where the microstrip line feed unit (3) is located.

11. The device according to claim 8, wherein the main radiation unit (2) comprises an annulus main radiation unit.

12. The device according to claim 8, wherein the microstrip line feed unit (3) comprises a first feed-in part (10) and a second feed-in part (11); an initial end (5) of the first feed-in part (10) is electrically connected to the main radiation unit (2); a first connection end of the first feed-in part (10) is electrically connected to a second connection end of the second feed-in part (11); the preset location comprises the second connection end;

wherein the second feed-in part (11) is configured to expand from the second connection end to the terminal end (6).

13. The device according to claim 12, wherein a projection of an axis (9) of the grounding plate on the front surface coincides with a projection of an axis of the microstrip line feed unit (3) on the front surface.

14. The device according to claim 8, wherein at least one of two curves of projections of contour lines from the first location (8) to two sides of a bottom (7) in a projection of the grounding plate (4) on the front surface, includes at least two different curvatures.

* * * * *